(12) United States Patent
Jeong et al.

(10) Patent No.: US 9,723,287 B2
(45) Date of Patent: Aug. 1, 2017

(54) ENHANCED 3D AUDIO/VIDEO PROCESSING APPARATUS AND METHOD

(71) Applicant: LG ELECTRONICS INC., Seoul (KR)

(72) Inventors: Sangoh Jeong, Seoul (KR); Kyungho Kim, Seoul (KR); Byeongmoon Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 14/408,197

(22) PCT Filed: Jul. 9, 2013

(86) PCT No.: PCT/KR2013/006103
§ 371 (c)(1),
(2) Date: Dec. 15, 2014

(87) PCT Pub. No.: WO2014/010920
PCT Pub. Date: Jan. 16, 2014

(65) Prior Publication Data
US 2015/0181192 A1  Jun. 25, 2015

Related U.S. Application Data

(60) Provisional application No. 61/669,626, filed on Jul. 9, 2012, provisional application No. 61/672,255, filed on Jul. 16, 2012.

(51) Int. Cl.
*H04N 13/00* (2006.01)
*H04N 21/81* (2011.01)
(Continued)

(52) U.S. Cl.
CPC ..... *H04N 13/0007* (2013.01); *H04N 13/0271* (2013.01); *H04N 21/816* (2013.01);
(Continued)

(58) Field of Classification Search
CPC .................................................. H04N 13/0007
See application file for complete search history.

(56) References Cited

U.S. PATENT DOCUMENTS

2005/0259147 A1  11/2005  Nam et al.
2010/0303444 A1*  12/2010  Sasaki ................. G11B 27/105
                                              386/248
(Continued)

FOREIGN PATENT DOCUMENTS

CN         1954606 A    4/2007
CN       101350931 A    1/2009
(Continued)

OTHER PUBLICATIONS

Audio, "Draft Use Cases, Requirements and Evaluation Procedures for 3D Audio," International Organisation for Standardisation, ISO/IEC JTC1/SC29/WG11 Coding of Moving Pictures and Audio, ISO/IEC JTC1/SC29/WG11/N12610, San Jose, USA, Feb. 11, 2012, 11 pages, XP030019084.
(Continued)

*Primary Examiner* — Tracy Y Li
(74) *Attorney, Agent, or Firm* — Birch, Stewart, Kolasch & Birch, LLP

(57) ABSTRACT

The enhanced 3D audio/video processing apparatus according to one embodiment of the present invention may comprise: a three-dimensional (3D) content generating unit for generating 3D content including video content and analog content; a depth information generating unit for generating depth information for the video frames constituting the video content; and a signal generating unit for generating a 3D enhanced signal including the generated 3D content and the depth information. Further, the enhanced 3D audio/video processing apparatus according to another embodiment of the present invention may comprise: a signal processing unit for processing the 3D enhanced signal including the 3D (Continued)

content including the video content and the audio content: a depth information extraction unit for acquiring the depth information of the video frames constituting the video content from the processed 3D enhanced signal; a 3D audio effect generating unit for generating 3D audio effect based on the acquired depth information; and a 3D audio content generating unit for generating 3D audio content by applying the generated 3D audio effect.

16 Claims, 13 Drawing Sheets

(51) Int. Cl.
 *H04N 13/02* (2006.01)
 *H04R 5/04* (2006.01)
(52) U.S. Cl.
 CPC ......... *H04R 5/04* (2013.01); *G10H 2210/301* (2013.01); *H04N 13/0062* (2013.01); *H04N 2013/0081* (2013.01)

(56) References Cited

U.S. PATENT DOCUMENTS

| | | | |
|---|---|---|---|
| 2011/0032338 A1* | 2/2011 | Raveendran | H04N 21/816 348/51 |
| 2011/0150098 A1* | 6/2011 | Lee | H04S 1/005 375/240.25 |
| 2011/0150101 A1 | 6/2011 | Liu et al. | |
| 2011/0164769 A1 | 7/2011 | Zhan et al. | |
| 2011/0274278 A1 | 11/2011 | Kim | |
| 2012/0002024 A1 | 1/2012 | Choi et al. | |
| 2012/0251069 A1* | 10/2012 | Ikizyan | H04N 9/8205 386/230 |
| 2013/0010969 A1 | 1/2013 | Cho et al. | |

FOREIGN PATENT DOCUMENTS

| | | |
|---|---|---|
| CN | 101982979 A | 3/2011 |
| CN | 102474661 A | 5/2012 |
| EP | 2323425 A1 | 5/2011 |
| JP | 2006-128818 A | 5/2006 |
| KR | 10-2011-0106715 A | 9/2011 |
| KR | 10-2011-0122631 A | 11/2011 |
| KR | 10-2011-0134087 A | 12/2011 |
| WO | WO 2005/114998 A1 | 12/2005 |

OTHER PUBLICATIONS

Kim et al., "3D Audio Depth Rendering for Enhancing an Immersion of 3DTV," Audio Engineering Society Convention Paper 8522, Presented at the 131st Convention, New York, NY, USA, Oct. 20-23, 2011, pp. 1-7, XP040567596.

* cited by examiner

| frame ID (sample index) | 1 | 2 | 3 | 4 | 5 | 6 | 7 | 8 | 9 | 10 | 11 | 12 |
|---|---|---|---|---|---|---|---|---|---|---|---|---|
| decoding time | 0 | 10 | 20 | 30 | 40 | 50 | 60 | 70 | 80 | 90 | 100 | 110 |
| depth_range | 16 | 16 | 16 | 16 | 16 | 16 | 16 | 16 | 16 | 16 | 16 | 16 |
| depth_level | 3 | 3 | 4 | 5 | 4 | 7 | 11 | 11 | 11 | 10 | 8 | 6 |

(b)

| entry count | sample_index | depth_range | depth_level |
|---|---|---|---|
| 1 | 1 | 16 | 3 |
| 2 | 2 | 16 | 3 |
| 3 | 3 | 16 | 4 |
| 4 | 4 | 16 | 5 |
| 5 | 5 | 16 | 4 |
| 6 | 6 | 16 | 7 |
| 7 | 7 | 16 | 11 |
| 8 | 8 | 16 | 11 |
| 9 | 9 | 16 | 11 |
| 10 | 10 | 16 | 10 |
| 11 | 11 | 16 | 8 |
| 12 | 12 | 16 | 6 |

FIG. 4

| frame ID (sample index) | 1 | 2 | 3 | 4 | 5 | 6 | 7 | 8 | 9 | 10 | 11 | 12 |
|---|---|---|---|---|---|---|---|---|---|---|---|---|
| decoding time | 0 | 10 | 20 | 30 | 40 | 50 | 60 | 70 | 80 | 90 | 100 | 110 |
| sample offset | 1 | 2 | 1 | 1 | 1 | 1 | 1 | 2 | 3 | 1 | 1 | 1 |
| depth_level | 3 | | 4 | 5 | 4 | 7 | 11 | | | 10 | 8 | 6 |

(a)

| entry count | sample_index | sample_offset | depth_level |
|---|---|---|---|
| 1 | 1 | 2 | 3 |
| 2 | 3 | 1 | 4 |
| 3 | 4 | 1 | 5 |
| 4 | 5 | 1 | 4 |
| 5 | 6 | 1 | 7 |
| 6 | 7 | 3 | 11 |
| 7 | 10 | 1 | 10 |
| 8 | 11 | 1 | 8 |
| 9 | 12 | 1 | 6 |

| frame ID (sample index) | 1 | 2 | 3 | 4 | 5 | 6 | 7 | 8 | 9 | 10 | 11 | 12 |
|---|---|---|---|---|---|---|---|---|---|---|---|---|
| decoding time | 0 | 10 | 20 | 30 | 40 | 50 | 60 | 70 | 80 | 90 | 100 | 110 |
| sample_offset | 1 | 2 | 3 | 4 | 5 | 6 | 1 | 2 | 3 | 4 | 5 | 6 |
| depth_range | 16 | | | | | | 4 | | | | | |
| (depth_level) | 3 | 6 | 9 | 12 | | | 3 | 2 | 1 | 0 | | |

(a)

| entry count | sample_index | sample_offest | depth_range |
|---|---|---|---|
| 1 | 1 | 6 | 16 |
| 2 | 7 | 6 | 4 |

(b)

num_depth_level = 16

Frame groups having the same num_depth_level

ENHANCED 3D AUDIO/VIDEO PROCESSING APPARATUS AND METHOD

CROSS REFERENCE TO RELATED APPLICATIONS

This application is the National Phase of PCT International Application No. PCT/KR2013/006103, filed on Jul. 9, 2013, which claims priority under 35 U.S.C. 119(e) to U.S. Provisional Application Nos. 61/669,626 and 61/672,255, filed on Jul. 9, 2012 and Jul. 16, 2012 respectively, all of which are hereby expressly incorporated by reference into the present application.

TECHNICAL FIELD

The present invention relates to a wireless communication system, and more particularly to a method and apparatus for processing enhanced three-dimensional (3D) audio and video data, and more particularly to a method and apparatus for processing the enhanced 3D audio/video data to perform signaling of depth-associated information that controls a 3D audio depth based on a 3D video depth using an MPEG file format.

BACKGROUND ART

With widespread use of three-dimensional (3D) televisions (TVs), 3D video content based on storage media and 3D video content transmission based on digital broadcasting have rapidly come into widespread use. In addition, 3D audio content based on the 3D effect has been widely applied not only to video content but also to audio content.

With the increasing development of such digital technology, users have continuously requested more precise audio/video (A/V) experiences. In order to maximize A/V experiences in response to user demand, an advanced sound system to which the stereo sound and surround sound technology capable of being applied to a general home theater system (HTS) are applied has emerged.

Since most TVs or HTSs have two speakers, the stereo sound system is generally used to provide sound experience to users. However, since a high-end HTS has two or more speakers, the surround sound system has been widely used to provide users with more gentle and precise sound experiences.

Recently, there has been intensively discussed 3D audio technology for reproducing the direction and distance within the 3D sound space to generate the 3D sound effect, thus providing 3D sound. In the 3D audio technology, an acoustic sweet spot in which sound reproduction is controlled, i.e., the position or range within which users can listen to the best sound, may be some parts of the 3D space and user-audible sound.

In addition, 3D video technology and 3D audio technology can be respectively applied to content, and demand for 3D content to which 3D video technology and 3D audio technology are simultaneously applied is rapidly increasing. That is, although demand for 3D content to which the 3D video effect and the 3D audio effect are independently applied using legacy 3D video technology and legacy 3D audio technology is increasing, demand for 3D content acquired by synchronization between the 3D video effect and the 3D audio effect is more rapidly increasing.

DISCLOSURE

Technical Problem

An object of the present invention is to provide a method and apparatus for processing enhanced 3D audio/video data that performs signaling of depth information using the MPEG file format so as to generate the 3D audio effect in response to a depth of 3D video, such that the 3D video effect is synchronized with the 3D audio effect.

Technical Solution

The object of the present invention can be achieved by providing an enhanced three-dimensional (3D) audio/video (A/V) processing method including: generating three-dimensional (3D) content including video content and audio content; generating depth information of video frames constructing the video content, and generating a 3D enhanced signal including the generated 3D content and the depth information. The depth information is used to generate a 3D audio effect to be applied to the audio content, the depth information including frame identification information, depth level information and depth range information. The frame identification information indicates a frame number for identifying each video frame, the depth level information indicates the degree of 3D effect to be applied to each video frame, and the depth range information indicates a total number of levels of the depth level.

In accordance with another aspect of the present invention, an enhanced three-dimensional (3D) audio/video (A/V) processing method includes: processing a three-dimensional (3D) enhanced signal including 3D content configured to have video content and audio content; acquiring depth information of video frames constructing the video content from the processed 3D enhanced signal; generating a 3D audio effect according to the acquired depth information; and generating 3D audio content on the basis of the generated 3D audio effect. The depth information is used to generate a 3D audio effect to be applied to the audio content, the depth information including frame identification information, depth level information and depth range information. The frame identification information indicates a frame number for identifying each video frame, the depth level information indicates the degree of 3D effect to be applied to each video frame, and the depth range information indicates a total number of levels of the depth level.

Advantageous Effects

As is apparent from the above description, the enhanced 3D A/V device can generate the 3D sound effect using signaling information based on a 3D video depth, so that it can provide 3D content in which 3D video data and 3D audio data are correctly synchronized.

In accordance with the present invention, the enhanced 3D A/V device can generate a 3D sound effect using signaling information based on the 3D video depth, resulting in reduction of complexity of device design.

In accordance with the present invention, when signaling information based on the 3D video depth is transmitted, the enhanced 3D A/V device removes redundant information and transmits the remaining information other than the redundant information, resulting in acquisition of higher transmission efficiency.

DESCRIPTION OF DRAWINGS

FIG. 3 is a conceptual diagram illustrating a depth table according to an embodiment of the present invention.

FIG. 4 is a conceptual diagram illustrating a depth table according to another embodiment of the present invention.

FIG. 5 is a conceptual diagram illustrating a depth table according to another embodiment of the present invention.

BEST MODE

Figure 1:
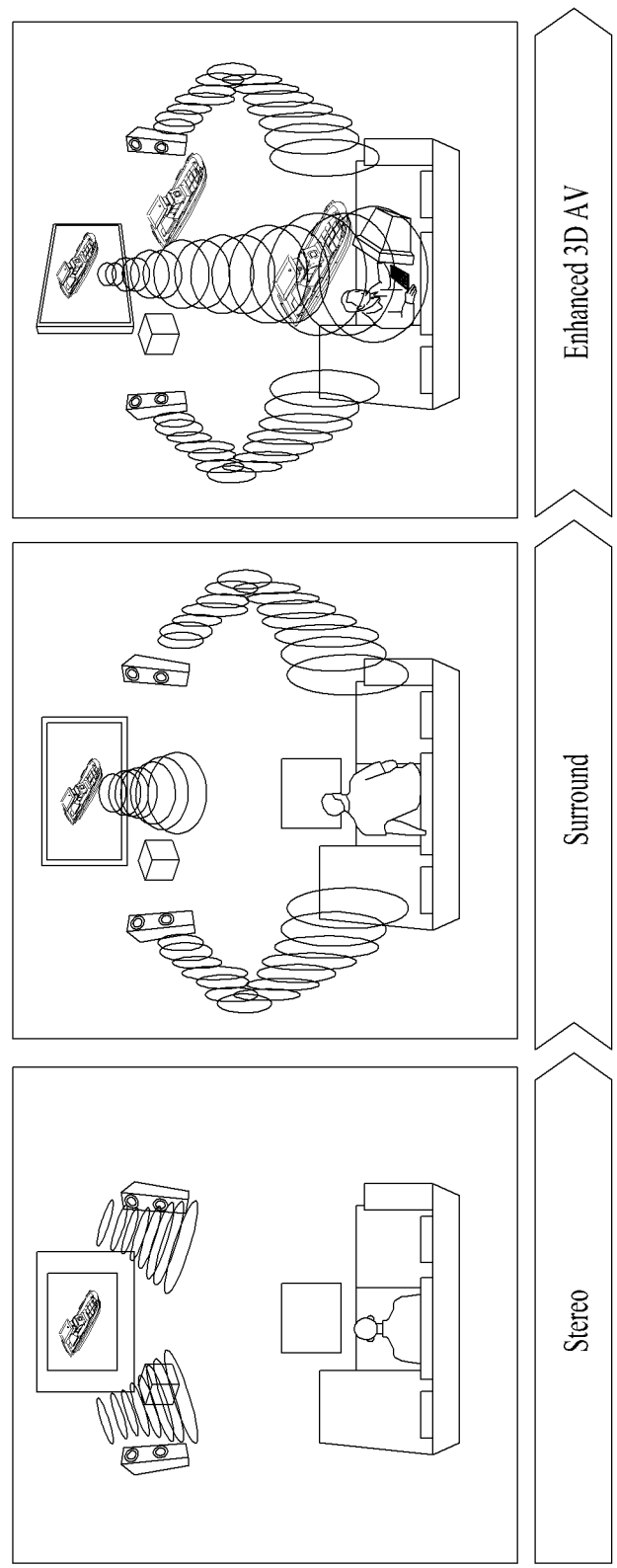
FIG. 1 is a conceptual diagram illustrating a development process of an audio system.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

With increasing development of digital technology, users demand better audio/video (AV) experiences. In order to maximize A/V experiences in response to the user request, the advanced sound system to which the stereo sound and surround sound technology applicable to a general Home Theater System (HTS) is applied has recently emerged.

Since most TVs or HTSs have two speakers, the stereo sound system is generally used to provide users with the sound experiences. However, since a high-end HTS has two or more speakers, the surround sound system has been widely used to provide users with more gentle and more exquisite sound experiences.

In recent times, there has been intensively discussed the 3D audio technology for generating the 3D audio effect by reproducing the direction and distance of sound source within the 3D sound space. In the 3D audio technology, acoustic sweet spot in which sound reproduction is controlled, i.e., the position or range in which users can listen to the best sound, may be some parts of the 3D space and user-audible sound.

In addition, with increasing development of technologies, the 3D video technology and the 3D audio technology can be respectively applied to content, and demand for 3D content to which 3D video technology and 3D audio technology are simultaneously applied is rapidly increasing. That is, although demand for 3D content to which the 3D video effect and the 3D audio effect are independently applied using the legacy 3D video technology and the legacy 3D audio technology is increasing, demand for 3D content acquired by synchronization between the 3D video effect and the 3D audio effect is more rapidly increasing.

In this case, assuming that the depth of 3D audio data is correctly synchronized with the depth of 3D video data, it may be possible to provide users with exquisite enhanced 3D A/V experiences.

Therefore, the present invention provides the enhanced 3D enhanced 3D A/V processing method and apparatus to perform signaling of depth information needed for control of the depth of 3D audio in response to the depth of 3D video data using the MPEG file format.

FIG. 1 is a conceptual diagram illustrating a development process of an audio system. Referring to FIG. 1, the audio system has evolved from a two-channel stereo audio system to a 3D audio/video (AV) system. A detailed description of the development process shown in FIG. 1 will hereinafter be described in detail.

FIG. 1(a) is a conceptual diagram illustrating the stereo audio system. FIG. 1(b) is a conceptual diagram of the surround audio system. FIG. 1 (c) is a conceptual diagram illustrating the enhanced 3D audio system proposed by the present invention.

The stereo audio system may provide a user with audio through two speakers contained in a general TV or HTS as shown in FIG. 1(a). The surround audio system may provide a user with audio through two or more speakers as shown in FIG. 1(b). The surround audio system provides basic audio through two channels used in the stereo audio system, provides additional audio through additional speakers mounted to a front side, a lateral side, and a back surface of the audio system, resulting in implementation of the stereoscopic sound effect.

The enhanced 3D audio/video (AV) system shown in FIG. 1(c) can have a plurality of channels enclosing users, and can generate the 3D audio effect to be applied to 3D audio data provided in the 3D sound space using depth information obtained from video content. The 3D sound space is a region established to provide 3D audio data, and may be divided into a plurality of audio spots according to a plurality of depth levels. Each audio spot may be defined as a specific position contained in the 3D sound space. 3D audio data processed in response to each depth level may be provided to each audio spot. In addition, the 3D audio effect applied to each audio spot may be defined as a sound depth level. In addition, the sound depth level may be determined according to the depth information of the above-mentioned 3D video data. Therefore, the depth information of video content is obtained to generate a 3D audio effect corresponding to the audio spot of the 3D sound space, and a high-quality 3D audio/video (AV) experience can be provided to the user using the 3D audio effect to audio content corresponding to current video content. The enhanced 3D audio/video (AV) system may use two channels, and may also use two or more channels.

Figure 2:
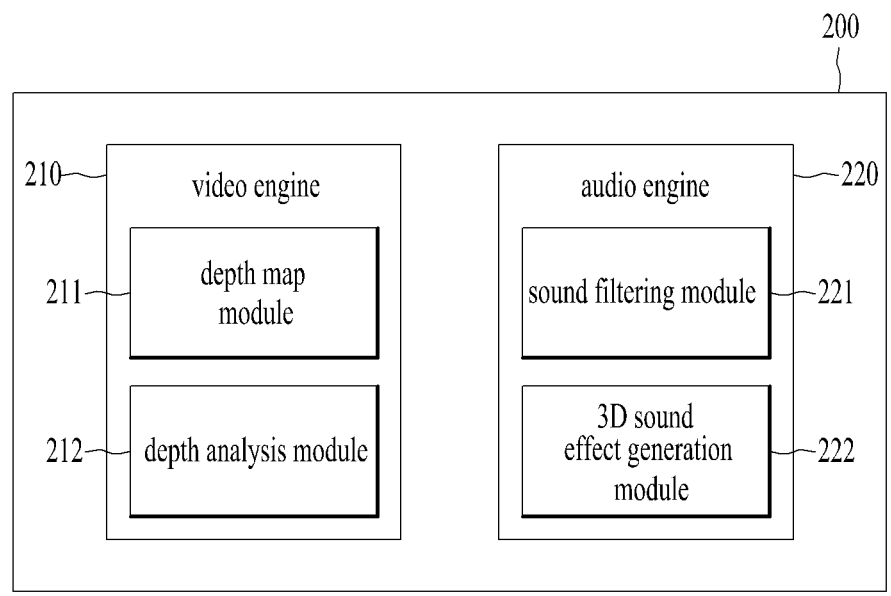
FIG. 2 is a conceptual diagram illustrating an enhanced 3D audio/video (AV) processing device.

FIG. 2 is a conceptual diagram illustrating an enhanced 3D audio/video (AV) processing device.

Referring to FIG. 2, the enhanced 3D audio/video (AV) processing device may include a video engine 210 and an audio engine 220. The video engine 210 may include a depth map module 211 and a depth analysis module 212, and the audio engine 220 may include a sound filtering module 221 and a 3D sound effect generation module 222.

The above-mentioned modules shown in FIG. 2 will hereinafter be described in detail. The depth map module 211 contained in the video engine 210 may extract a depth map regarding both a left frame for transmission of a left view image of 3D video content and a right frame for transmission of a right view image of the 3D video content from a 3D video stream.

Generally, the 3D video content provides a user's eyes with a stereoscopic effect using the principle of stereovision. A human being senses a distance through a binocular parallax caused by a distance between their eyes spaced apart from each other by about 65 mm, such that a 3D image enables both right and left eyes to respectively view an associated left-view image and right-view image, resulting in the stereoscopic effect and the perspective effect. Therefore, the left frame and the right frame may be paired for the stereoscopic effect.

The depth may indicate the stereoscopic effect, i.e., the amount of 3D effect, and may be represented by a specific digitized numerical unit, and may also be changed according to designer's intention. The same or different depths of paired frames (i.e., frame pairs) according to an embodiment may be assigned to respective frames.

The depth map module 211 may extract information regarding the depth assigned to each frame, may generate a depth map indicating depth information corresponding to each frame, and may extract a depth map contained in the 3D video stream. The depth analysis module 212 may analyze the generated depth map or the extracted depth map, and thus determine representative video depth levels of the respective pair frames. Thereafter, the video engine 210 may transmit video depth levels decided by the depth analysis module 212 to the audio engine 220.

The sound filtering module 221 contained in the audio engine 220 may filter audio. Thereafter, the 3D sound effect generation module 222 may generate or decide the 3D audio effect (or 3D sound effect) capable of indicating the 3D effect in the filtered audio. The sound depth level of the 3D audio effect may be decided by the above-mentioned video depth level, so that the 3D-audio depth level may be synchronized with the 3D-video depth level.

The enhanced 3D A/V processing device shown in FIG. 2 has the following disadvantages.

First, high development costs and high production costs requisite for device design may encounter some problems. In accordance with the above-mentioned enhanced 3D A/V processing device, the video engine 210 may decide 3D video depth levels, and the audio engine 220 may generate the 3D audio effect corresponding to the decided 3D video depth levels. Therefore, high development costs and high production costs may be required to design the video engine capable of deciding 3D video depth levels.

Second, increasing the design complexity may cause some problems in device design. Generally, the video engine design for processing high-quality 3D video data in real time requires higher complexity than the audio engine. Therefore, the device for synchronizing between the video engine and the audio engine in real time may request additional complexity in terms of device design.

Finally, low accuracy and low level of satisfaction may also cause unexpected problems. The current 3D content need not always include 3D audio effects synchronized with depth levels obtained by the 3D video analysis result. Therefore, although the enhanced 3D A/V processing device is developed with high design complexity and high production costs, the 3D audio content may have a lower quality than the 3D video content because the depth level for adjusting the 3D audio effect has low accuracy. Moreover, since the 3D effect applied to 3D video content is variable, the accuracy of a depth level of each video frame may be deteriorated.

In order to address the above-mentioned problems, the present invention provides a method for signaling depth information capable of supporting enhanced 3D A/V content through the MPEG file format.

Video images and audio data capable of constructing the above-mentioned 3D content may be compression-coded in various ways such as Moving Picture Experts Group (MPEG). For example, images for constructing 3D video contents and audio data for constructing 3D audio content may be compression-coded using the MPEG or H.264/AVC (Advanced Video Coding) scheme. In this case, the receiver may decode video images and audio data in reverse order of the MPEG or H.264/AVC scheme, so that it can obtain 3D content.

The MPEG file format may be used to transmit video and audio streams constructing the 3D content compressed by the MPEG scheme, and may indicate a multimedia container format including other additional data. In more detail, the MPEG file format may include a media data container having data of the actual A/V stream and a metadata container having specific information needed for reproduction of information or files associated with content. In the present invention, the media data container will hereinafter be referred to as a media data box, and the metadata container will hereinafter be referred to as a meta data box. Each container may include sub boxes or sub atoms, each of which can be identified.

The media data container may store data of the A/V stream in units of a frame. The media data container may include A/V tracks of the A/V streams and a sample table box.

The A/V samples may be an access unit for approaching the A/V streams stored in units of a frame. Each of the A/V samples may indicate data of each of the video frame and the audio frame. In the present invention, the term "sample" will hereinafter be referred to as a frame for convenience of description. In addition, the A/V track may indicate a set of A/V samples. The sample table box may include a timing point of each sample contained in each track and an index for a physical layout.

Therefore, the 3D content transmission/provision unit (i.e., 3D content transmitter) may perform signaling of the above depth information through the MPEG file format, the 3D content receiver may detect depth-related information signaled through the MPEG file format, may decide the 3D sound depth to generate the 3D audio effect, and may provide a user with the enhanced 3D content. That is, as can be seen from FIG. 2, the video depth level is not extracted or processed in real time, and the 3D audio effect can be generated using depth information contained in the MPEG file format, so that higher-quality enhanced 3D content can be provided.

A signaling method for transmitting the above-mentioned depth information through the MPEG file format according to the embodiments will hereinafter be described in detail.

The depth information according to the embodiment may be contained in the above-mentioned sample table box, and may be changeable according to the designer contention. Specifically, the depth information according to one embodiment may include either depth level information or depth range information of a video frame for adjusting the sound depth level of the 3D audio effect, and may be changeable according to the designer intention. The depth information according to one embodiment may be signaled every video track. In this case, the depth information may include "num_depth_levels" information. The "num_depth_levels" information may indicate the number of depth levels for adjusting the sound depth of the 3D audio effect, and may be identical to the number of depth levels defined for each video frame. The depth level value may include a total of 9 level values of 1 to 9. The "num_depth_levels" information may be respectively assigned 1, 2, 4, 8, 16, 32, 64, 128, and 256 according to the respective depth levels of 1~9. In addition, "num_depth_levels" may indicate the number of depth levels corresponding to each video track.

The "num_depth_levels" information according to one embodiment may be contained in a sample entry element "VisualSampleEntry" or "AudioSampleEntry" contained in the above-mentioned sample table box, and may be contained in a sub box "DepthLevelsFor3DA VBox" contained in the sample table box. The term "DepthLevelsFor3DA VBox" may also be changed to another according to designer intention, and "DepthLevelsFor3DA VBox" may be contained in the above-mentioned sample entry element "VisualSampleEntry" or "AudioSampleEntry" and may also be changed according to designer intention.

The following Table 1 shows an exemplary case in which the "num_depth_levels" information is signaled as a syntax through "VisualSampleEntry". The following Table 2 shows an exemplary case in which the "num_depth_levels" information is signaled as a syntax through "AudioSampleEntry".

TABLE 1

```
class VisualSampleEntry(codingname) extends SampleEntry
(codingname){
        unsigned int(16) pre_defined = 0;
        const unsigned int(16) reserved = 0;
        unsigned int(32)[3]      pre_defined = 0;
        unsigned int(16) width;
        unsigned int(16) height;
        template unsigned int(32) horizresolution = 0x00480000;
        template unsigned int(32) vertresolution = 0x00480000;
        const unsigned int(32)    reserved = 0;
        template unsigned int(16) frame_count = 1;
        string[32]            compressorname;
        template unsigned int(16) depth = 0x0018;
        int(16) pre_defined = −1;
        unsigned int(4)   num_depth_levels;
        CleanApertureBox              clap;
        PixelAspectRatioBox      pasp;
}
```

TABLE 2

```
class AudioSampleEntry(codingname) extends SampleEntry
(codingname){
    const unsigned int(32)[2] reserved = 0;
    template unsigned int(16) channelcount = 2;
```

TABLE 2-continued

```
    template unsigned int(16) samplesize = 16;
    unsigned int(16) pre_defined = 0;
    unsigned int(4) num_depth_levels;
    const unsigned int(8) reserved = 0 ;
    template unsigned int(32) samplerate = { default samplerate of
    media}<<16;
    }
```

The following Table 3 shows an exemplary case in which the "num_depth_levels" information is signaled as a syntax through "DepthLevelsFor3DA VBox". As described above, "DepthLevelsFor3DA VBox" may be contained in the above-mentioned sample entry element "VisualSampleEntry" or "AudioSampleEntry", and may also be contained in another sample entry element "MetadataSampleEntry". In Table 3, "DepthLevelsFor3DA VBox" is contained in "VisualSampleEntry".

TABLE 3

```
class DepthLevelsFor3DAVBox extends Box('dl3d') {
        unsigned int(4) num_depth_levels;
unsigned int(4)   reserved = 0;
}
class VisualSampleEntry(codingname) extends SampleEntry
(codingname){
        unsigned int(16) pre_defined = 0;
        const unsigned int(16) reserved = 0;
        unsigned int(32)[3]      pre_defined = 0;
        unsigned int(16) width;
        unsigned int(16) height;
        template unsigned int(32) horizresolution = 0x00480000;
        template unsigned int(32) vertresolution = 0x00480000;
        const unsigned int(32)    reserved = 0;
        template unsigned int(16) frame_count = 1;
        string[32]            compressorname;
        template unsigned int(16) depth = 0x0018;
        int(16) pre_defined = −1;
        CleanApertureBox              clap;
        PixelAspectRatioBox      pasp;
    DepthLevelsFor3DAVBox dl3d;
}
```

Depth information according to one embodiment may be signaled for each video sample (i.e., for each video frame). In this case, the depth information may include "depth_level_per_video_frame" information. The "depth_level_per_video_frame" information may indicate depth level information defined in each video frame, and may be used to decide the sound depth of the 3D audio effect applied to audio content corresponding to the video frame.

In more detail, the "depth_level_per_video_ frame" information may be set to any one of values contained in the range from 0 to a "num_depth_levels−1" value indicating the result obtained when the value of 1 is subtracted from the "num_depth_levels" information. That is, the "depth_level_per_video_frame" information may be set to any one of values corresponding to the range of a "num_depth_levels−1" value. If the "depth_level_per_video_frame" information is set to zero (0), the sound depth level of the 3D audio effect corresponding to the corresponding frame may be defined as a 3D sound depth level corresponding to an audio spot located nearest to either a television (TV) or a user who views the TV within the 3D sound space. In addition, if the "depth_level_per_video_frame" information is denoted by "num_depth_levels−1", the sound depth level of the 3D audio effect corresponding to the corresponding frame may be defined as a 3D sound depth level corresponding to an audio spot located farthest from the TV or the user.

The following table 4 shows an exemplary case in which the "depth_level_per_video_frame" information acting as syntax is contained in "DepthFor3DAVBox" according to another embodiment of the present invention.

TABLE 4

```
aligned(8) class DepthFor3DAVBox extends FullBox (
        int i;
        for(i = 0; i < sample_count; i++) {
                unsigned int(8)    depth_level_per_video_frame;
        }
}
```

A sample count value shown in Table 4 may be derived from a sample size box contained in the metadata container.

As described above, the 3D content transmitter/provider may signal "num_depth_levels" information and "depth_level_per_video_frame" information using the syntax of the MPEG file format shown in Tables 1 to 4, and the 3D content receiver may detect "num_depth_levels" information and "depth_level_per_video_frame" information contained in the syntax of the MPEG file formats shown in Tables 1 to 4, so that it can decide the 3D sound depth. However, the "depth_level_per_video_frame" information value needs to be defined for each sample, and the amount of "depth_level_per_video_frame" information contained in the syntax may cause unexpected problems.

Therefore, in order to reduce the "depth_level_per_video_frame" information value of each sample as well as to perform effective signaling, the present invention provides a signaling method for indicating depth information per sample group in which samples are grouped. In this case, the above-mentioned "num_depth_levels" information and the "depth_level_per_video_frame" information may be respectively signaled through two "DepthLevelsGroupFor3DAV".

The following table 5 shows a syntax according to another embodiment of the present invention, and shows an exemplary case in which "num_depth_levels" information and "depth_level_per_video_frame" information are respectively signaled through "DepthLevelsGroupFor3DAVBox" so as to indicate depth information for each sample group in which samples are grouped.

TABLE 5

```
aligned(8) class DepthLevelsGroupFor3DAV extends FullBox(
        unsigned int(32) entry_count;
        for(int i= 0; i < = entry_count; i++) {
                unsigned int(32) group_description_index;
                unsigned int(8) num_depth_levels;
        }
}
aligned(8) class DepthGroupFor3DAV extends FullBox(
        unsigned int(32) entry_count;
        for(int i=0; i <= entry_count; i++) {
                unsigned int(32) group_description_index;
                unsigned int(8)  depth_level_per_video_frame;
        }
}
```

As shown in Table 5, each of two "DepthLevelsGroupFor3DAV extends FullBox" units may include "entry_count" information and "group_description_index" information.

The "entry_count information may indicate a number of an entry for task processing, and may have an integer value. In addition, the "group_description_index" information may indicate the index of the same sample group entry indicating samples contained in a current group, and may have an integer value. The "group_description_index" information may be contained in "SampleToGroupBox" of the metadata container. In addition, as shown in Table 5, "DepthLevelsGroupFor3DAV extends FullBox" may include "num_depth_levels" information contained in each sample group, and the "num_depth_levels" information contained in each sample group may be identical to other "num_depth_levels" information of all samples contained in a group of the 3D video data.

In addition, since "depth_level_per_video_frame" information is contained in "DepthLevelsGroupFor3DAV extends FullBox", the same "depth_level_per_video_frame" information value may be applied to samples contained in each sample group.

As described above, depth information according to one embodiment may be signaled through the sample entry element of the sample table box or the like. A method for signaling various depth information through the box contained in the sample table according to one embodiment will hereinafter be described in detail.

Table 6 shows a syntax according to another embodiment of the present invention, and shows an exemplary case in which depth information is signaled through "DepthLevelsGroupFor3DAVBox" of the sample table box.

TABLE 6

```
aligned(8) class DepthFor3DAVBox extends FullBox(
        int i;
        unsigned int(32) entry_count;
        for(i = 0; i < entry_count; i++) {
                unsigned int(32) sample_index;
                unsigned int(8)  depth_range;
                unsigned int(8)  depth_level;
        }
}
```

Referring to Table 6, the signaled depth information may include "entry_counter" information, "sample_index" information, "depth_level" information, and "depth_range" information.

The "entry_counter" information may indicate a number of the entry contained in the depth table to be described later, and may have an integer value.

The "sample_index" information may indicate each sample contained in the current video track. That is, the "sample_index" information may indicate an index number of each frame, and may have an integer value.

The "depth_range" information may indicate a total number of levels of the depth level used to adjust the 3D sound depth. Although the "depth_range" information and the "num_depth_levels" information have different names, they can transmit the same information. In other words, the "depth_range" information may indicate the range of a depth level. Accordingly, if the "depth_range" information is set to zero (0), the "depth_level" information is meaningless.

The "depth_level" information is used to generate the 3D audio effect to be applied to audio content corresponding to a video frame. In more detail, the sound depth level of the 3D audio effect may be determined by the "depth_level" information. The "depth_level" information may indicate a depth level of each video frame. Although the "depth_level" information and the "depth_level_per_video_frame" information have different names, they can transmit the same information. Accordingly, the "depth_level" information may be set to any one of values contained in the range of 0 to "depth_range−1" value indicating the result obtained when the value of 1 is subtracted from the "depth_range"

information. That is, the "depth_level" information may be set to any one of values corresponding to the range of the "depth_range−1" value. If the "depth_level" information is set to zero (0), the sound depth level of the 3D audio effect corresponding to the corresponding frame may be defined as a 3D sound depth level corresponding to an audio spot located nearest to either a television (TV) or a user who views the TV within the 3D sound space. In addition, if the "depth_level" information is denoted by "depth_range−1", the sound depth level of the 3D audio effect corresponding to the corresponding frame may be defined as a 3D sound depth level corresponding to an audio spot located farthest from the TV or the user. That is, the 3D sound depth level may correspond to the above-mentioned "depth_level" information, and may have the same or different values according to respective audio spots.

As shown in Table 6, the "sample_index" information, the "depth_level" information, and the "depth_range" information may be located in a for-loop located next to the "entry counter" information, and may be defined in each entry defined in response to the "entry_counter" information value increasing one by one.

The syntax according to the embodiment of Table 6 may provide a depth table including depth levels and depth ranges of 3D video samples contained in the video track. The depth table will hereinafter be described in detail.

FIG. 3 is a conceptual diagram illustrating a depth table according to an embodiment of the present invention.

The depth table shown in FIG. 3 may be provided by the syntax of Table 6.

The depth table of FIG. 3(a) may include "sample_index" information, "decoding_time" information, "depth_range" information, and "depth_level" information. The "decoding_time" information may indicate a specific time at which each frame identified by the "sample_index" information is decoded. That is, the depth table of FIG. 3(a) may provide decoding time information, depth range information and depth level information of the respective frames contained in the video track.

The depth table shown in FIG. 3(b) may include "entry_counter" information, "sample_index" information, "depth_range" information, and "depth_level" information. That is, the depth table of FIG. 3(b) may provide the depth range information (depth_range) and the depth level information (depth_level) of the frame being processed at each entry.

The depth table of FIG. 3(b) may be acquired from the depth table of FIG. 3(a). The depth table shown in FIG. 3(b) may be generated and transmitted from a transmitter, and may also be generated by a receiver using the depth table shown in FIG. 3(a). The above-mentioned description may be changed according to designer intention.

The depth table shown in FIG. 3(a) will hereinafter be described in detail.

As shown in FIG. 3(a), a first row of the depth table may include "sample_index" information values for identifying the frame contained in the video track, the second to fourth rows may respectively include a "decoding_time" information value, a "depth_range" information value, and a "depth_level" information value. The decoding_time "information value, the "depth_range" information value, and the "depth_level" information value respectively contained in the second, third, and fourth rows may be defined in each frame of the first row.

In more detail, as shown in the depth table of FIG. 3(a), Frame 1 having the "sample_index" information value of 1 corresponds to a first frame of the corresponding video track, so that Frame 1 may have the "decoding_time" information value of zero (0). In addition, the depth range of Frame 1 is set to 16 according to the depth table of FIG. 3(a), and the depth level of Frame 1 corresponds to the value of 3. In addition, as shown in the depth table of FIG. 3(a), Frame 2 having the "sample_index" information value of 2 is decoded after the first frame (Frame 1) is decoded, so that the "decoding_time" information value of Frame 2 may be set to 10. As shown in the depth table of FIG. 3(a), the depth range of Frame 2 may be set to 16, and the depth level of Frame 2 may be set to 3.

The depth table of FIG. 3(b) will hereinafter be described in detail.

As shown in FIG. 3(b), a first row of the depth table may indicate "entry_ counter" information, "sample_index" information, "depth_range" information, and depth_level" information to identify each column. A first row of the depth table of FIG. 3(b) may include an "entry_counter" information value, and the second to fourth columns may respectively include a "sample_index" information value, a "depth_range" information value, and a "depth_level" information value.

As shown in FIG. 3(a), the respective frames staring from the first frame are sequentially processed, so that a frame corresponding to Entry 1 may be a frame having the "sample_index" information value of 1. Therefore, as shown in the depth table of FIG. 3(b), if the entry_counter information value is set to 1, the "sample_index" information value may be set to 1. Therefore, the depth range of a frame having the "sample_index" information value is set to 16 and the depth level of the frame is set to 3, so that the "depth_range" information value of the depth table of FIG. 3(b) may be denoted by 16 and the "depth_level" information value may be denoted by 3.

In the same manner, since a frame corresponding to the second entry is a frame having the "sample_index" information value of 2, if the "entry_counter" information value is set to 2, the "sample_index" information value may be denoted by 2, the "depth_range" information value may be denoted by 16, and the "depth_level" information value may be denoted by 3. In addition, since a total number of frames is 12, the number of entries of the depth table of FIG. 3(b) may be set to 12.

Therefore, the receiver may obtain not only information regarding the depth range of each frame per entry but also information regarding the depth level of each frame per entry using the depth table shown in FIG. 3, may decode a video frame according to the acquired information, and at the same time may generate the 3D sound effect corresponding to the depth range and the depth level of each frame, so that synchronized 3D audio may be generated per frame.

However, the depth table shown in FIG. 3 includes depth information regarding all frames. If the number of frames contained in one video track increases, capacity of the depth table may increase. Specifically, even when some frames have the same depth range and the same depth level, redundant information is present, resulting in reduction in transmission efficiency.

In order to reduce capacity of the depth table as well as to increase transmission efficiency, the signaling method according to the present invention may remove redundant information of frames having the same depth range and the same depth level, may transmit the "depth_range" information and the "depth_level" information through separate syntaxes, and may provide independent depth tables.

Table 7 shows a syntax according to another embodiment of the present invention, and shows an exemplary case in which the depth level information is signaled through "DepthLevelsGroupFor3DAVBox" contained in the sample table box.

TABLE 7

```
aligned(8) class DepthLevelFor3DAVBox extends FullBox(
        int i;
        unsigned int(32) entry_count;
        for(i = 0; i < entry_count; i++) {
                unsigned int(32) sample_index;
                unsigned int(32) sample_offset;
                unsigned int(8)  depth_level;
        }
```

Although the syntax shown in Table 7 includes "entry_counter" information, "sample_index" information, and "depth_level" information in the same manner as in the syntax of Table 6, the syntax of Table 7 may not include "depth_range" information but include "sample_offset" information in a different way from Table 6. The same information as in Table 6 will be omitted from Table 7, and as such a detailed description of the "sample_offset" information will hereinafter be described in detail.

The "sample_offset" information may indicate an offset that represents the number of consecutive frames to which the same depth level is applied from among a plurality of frames contained in the video track. Therefore, the "sample_index" information value and the "sample_offset" information value of consecutive frames to which the same depth level is applied may be sequentially increased from 1, and a detailed description thereof will be given later.

In the same manner as in the syntax of Table 6, the syntax shown in Table 7 according to another embodiment may provide the depth table of the depth level of 3D video samples contained in the video track. The depth table will hereinafter be described in detail.

FIG. 4 is a conceptual diagram illustrating a depth table according to another embodiment of the present invention.

The syntax of Table 7 may provide the depth table shown in FIG. 4 as described above.

The depth table shown in FIG. 4(a) may include a "sample_index" information value, a "decoding_time" information value, a "sample_offset" information value, and a "depth_level" information value. That is, the depth table shown in FIG. 4(a) may provide decoding time information of all samples contained in the video track, offset information of consecutive frames to which the same depth level is applied, and depth level information of the consecutive frames.

The depth table shown in FIG. 4(b) may include an "entry_counter" information value, a "sample_index" information value, a "sample_offset" information value, and a "depth_level" information value. That is, the depth table shown in FIG. 4(b) may provide a depth level of the processed frame and offset information of frames having the same depth level to each entry.

The depth table shown in FIG. 4(b) may be obtained from the depth table shown in FIG. 4(a). In addition, the depth table shown in FIG. 4(b) may be generated and transmitted from the transmitter, and may also be generated by the receiver using the syntax shown in Table 7 and the depth table shown in FIG. 4(a). The above-mentioned description may be changed according to designer intention.

The depth table shown in FIG. 4(a) will hereinafter be described in detail.

As shown in FIG. 4(a), a first row of the depth table may include "sample_index" information values for identifying the frame contained in the video track, the second to fourth rows may respectively include a "decoding_time" information value, a "sample_offset" information value, and a "depth_level" information value. The decoding_time "information value, the "sample_offset" information value, and the "depth_level" information value respectively contained in the second, third, and fourth rows may be defined in each frame of the first row.

As shown in the depth table of FIG. 4(a), Frame 1 having a "sample_index" information value of 1 may have a depth level of 3 according to the "depth_level" information value. As described above, if consecutive frames have the same depth level, only the "depth_level" information value of the first frame having the corresponding depth level is displayed on the depth table, and the "depth_level" information values of the next consecutive frames are not displayed. Therefore, as shown in FIG. 4(a), the depth level of Frame 2 having a "sample_index" information value of 2 is identical to the depth level of Frame 1, so that the redundant "depth_level" information value is not displayed on the depth table. In the same manner, Frame 8 having a "sample_index" information value of 8 and Frame 9 having a "sample_index" information value of 9 have the same depth level as that of Frame 7 having the "sample_index" information value of 7, so that the "depth_level" information values of Frame 8 and Frame 9 are not displayed on the depth table.

In addition, the "sample_offset" value of frames having the same depth level may be sequentially increased from the first frame from among the corresponding frames. Therefore, as shown in FIG. 4(a), a "sample_offset" value of Frame 1 is set to 1, and a "sample_offset" value of Frame 2 is increased from the "sample_offset" value of Frame 1 by one. In contrast, Frame 3 having a "sample_index" information value of 3 has a depth_level information value of 4, and has a depth level different from those of Frame 1 and Frame 2, so that the "sample_offset" value of Frame 3 is denoted by 1.

In the same manner, in the case of Frames 7 to 9 having the same depth level, Frame 7 has a "sample_offset" value of 1, Frame 8 has a "sample_offset" value of 2, and Frame 9 has a "sample_offset" value of 3. Frame 10 having a "sample_index" information value of 10 has a depth level different from those of Frames 7 to 9, so that the "sample_offset" value of Frame 10 is denoted by 1.

The depth table shown in FIG. 4(b) will hereinafter be described in detail.

As shown in FIG. 4(b), a first row of the depth table may indicate "entry_ counter" information, "sample_index" information, "sample_offset" information, and depth_level" information to identify each column. A first row of the depth table of FIG. 3(b) may include an "entry_counter" information value, and the second to fourth columns may respectively include a "sample_index" information value, a "sample_offset" information value, and a "depth_level" information value.

In this case, frames in which the same depth level is applied to respective entries can be simultaneously processed, so that the "sample_index" information value corresponding to each entry is displayed as a "sample_index" information value of the first frame from among a plurality of frames having the same depth level. In addition, the "sample_offset" information value corresponding to each entry may be displayed as a "sample_index" information value of the last frame from among a plurality of frames having the same depth level.

In more detail, the same depth level is applied to Frame 1 and Frame 2 as shown in FIG. 4(a), so that Frame 1 and Frame 2 can be simultaneously processed. As shown in a first row of the depth table shown in FIG. 4(b), a "sample_index" information value corresponding to Entry 1 may be displayed as a "sample_index" information value "1" of Frame 1, and a "sample_offset" information value may be displayed as a "sample_offset" information value "2" of Frame 2. In addition, the "depth_level" information value may be displayed as a "depth_level" information value "3" of Frame and Frame 2.

As shown in the depth table of FIG. 4(a), some frames ranging from Frame 3 having a "sample_index" information value "3" to Frame 6 having a "sample_index" information value "6" may have different "depth_level" information values. Therefore, the "sample_offset" information values and the "depth_level" information values of Frames 3 to 6 may be respectively displayed at rows of Entries 2 to 5 of the depth table of FIG. 4(b).

In addition, as shown in FIG. 4(a), since the same depth level is applied to Frames 7 to 9, the "sample_index" information value corresponding to Entry 6 of the depth table of FIG. 4(b) may be displayed as a "sample_index" information value "7" of Frame 7, and the "sample_offset" information value corresponding to Entry 6 may be displayed as a "sample_offset" information value "3" of Frame 9. In addition, the "depth_level" information value may be displayed as the "depth_level" information value "11" of Frames 7 to 9.

Referring to FIG. 4(a), although a total number of samples is set to 12, frames to which the same depth level is applied are simultaneously processed in each entry, so that the depth table of FIG. 4(b) may include information regarding 9 entries.

Therefore, the receiver may obtain information regarding the number of frames to which the same depth level is applied, using the depth table shown in FIG. 4, may obtain the same depth level information only once, may decode a video frame in response to the acquired information and at the same time may generate the sound effect corresponding to a depth level of each frame, so that the synchronized 3D audio can be efficiently generated in each frame.

Table 8 shows a syntax according to another embodiment of the present invention, and shows an exemplary case in which the depth range information is signaled through "DepthLevelsGroupFor3DAVBox".

TABLE 8

```
aligned(8) class DepthLevelsFor3DAVBox extends FullBox(
    int i;
    unsigned int(32) entry_count;
    for(i = 0; i < entry_count; i++) {
        unsigned int(32) sample_index;
        unsigned int(32) sample_offset;
        unsigned int(8)  depth_range;
    }
}
```

Although the syntax shown in Table 8 includes "entry_counter" information, "sample_index" information, and "sample_offset" information in the same manner as in the syntax of Table 7, the syntax of Table 8 may not include "depth_range" information but include "depth_range" information in a different way from Table 7. In addition, although the "sample_offset" information of Table 8 is identical to that of Table 7 in name, it should be noted that the "sample_offset" information of Table 8 may have other information different from the "sample_offset" information of Table 7. The same information as those of Tables 6 and 7 will be omitted from Table 8, and as such a detailed description of the "sample_offset" information contained in the syntax of Table 8 will hereinafter be described in detail.

The "sample_offset" information may indicate an offset that represents the number of consecutive frames to which the depth level having the same depth range is applied from among a plurality of frames contained in the video track.

Therefore, the "sample_index" information value and the "sample_offset" information value of consecutive frames to which the depth level having the same depth range is applied may be sequentially increased from 1, and a detailed description thereof will be given later.

In the same manner as in the syntaxes of Tables 6 and 7, the syntax shown in Table 8 according to another embodiment may provide the depth table of the depth range of 3D video samples contained in the video track. The depth table will hereinafter be described in detail.

FIG. 5 is a conceptual diagram illustrating a depth table according to another embodiment of the present invention.

The syntax of Table 8 may provide the depth table shown in FIG. 4 as described above.

The depth table shown in FIG. 5(a) may include a "sample_index" information value, a "decoding_time" information value, a "sample_offset" information value, and a "depth_range" information value. Optionally, the depth table shown in FIG. 5(a) may include a "depth_level" information value. That is, the depth table shown in FIG. 5(a) may provide decoding time information of all samples contained in the video track, offset information of consecutive frames to which the same depth level is applied, and depth range information of the consecutive frames.

The depth table shown in FIG. 5(b) may include an "entry_ counter" information value, a "sample_index" information value, a "sample_offset" information value, and a "depth_range" information value. That is, the depth table shown in FIG. 5(b) may provide a depth range of the processed frame and offset information of frames having the same depth level to each entry.

The depth table shown in FIG. 5(b) may be obtained from the depth table shown in FIG. 5(a). In addition, the depth table shown in FIG. 5(b) may be generated and transmitted from the transmitter, and may also be generated by the receiver using the syntax shown in Table 8 and the depth table shown in FIG. 5(a). The above-mentioned description may be changed according to designer intention.

The depth table shown in FIG. 5(a) will hereinafter be described in detail.

As shown in the depth table of FIG. 5(a), Frame 1 having a "sample_index" information value of 1 may have a depth level of 3 according to the "depth_level" information value, and the depth range of the depth level is set to 16 according to the "depth_range" information value. As described above, if the depth ranges of depth levels of consecutive frames are identical to each other, only the "depth_range" information value of the first frame having the corresponding depth level based on the corresponding depth range is displayed on the depth table, and the "depth_range" information values of the next consecutive frames are not displayed. In this case, information as to whether the "depth_level" information values of consecutive frames are identical to each other is not significant.

Therefore, as shown in FIG. 5(a), the depth ranges of depth levels of Frames 2~6 respectively having the sample_index information values 2~6 are identical to the depth range of Frame 1, so that the redundant "depth_range" information value is not displayed on the depth table.

In addition, the "sample_offset" value of frames having the same depth level corresponding to the same depth range may be sequentially increased from the first frame from among the corresponding frames. Therefore, as shown in FIG. 5(a), a "sample_offset" value of Frame 1 is set to 1, and a "sample_offset" value of Frame 2, 3, 4, 5, or 6 is increased from the "sample_offset" value "1" of Frame 1 by one, so that the "sample_offset" values of Frames 2 to 6 are respectively denoted by 2, 3, 4, 5, and 6. In contrast, a "depth_range" information value "4" of Frame 7 is different from a "depth_range" information value of Frame 1, so that the "depth_range" information value "4" of Frame 7 is displayed on the depth table, and the "sample_offset" value of Frame 7 is denoted by 1.

The depth table shown in FIG. 5(b) will hereinafter be described in detail.

As shown in FIG. 5(b), a first row of the depth table may indicate "entry_ counter" information, "sample_index" information, "sample_offset" information, and depth_range" information to identify each column. A first row of the depth table of FIG. 5(b) may include an "entry_counter" information value, and the second to fourth columns may respectively include a "sample_index" information value, a "sample_offset" information value, and a "depth_range" information value.

In this case, frames in which the same depth level corresponding to the same depth range is applied to respective entries can be simultaneously processed, so that the "sample_index" information value corresponding to each entry is displayed as a "sample_index" information value of the first frame from among a plurality of frames having the same depth level. In addition, the "sample_offset" information value corresponding to each entry may be displayed as a "sample_index" information value of the last frame from among a plurality of frames having depth levels corresponding to the same depth range.

In more detail, the same depth level corresponding to the same depth range is applied to Frames 1 to 6 as shown in FIG. 5(a), so that Frames 1 to 6 can be simultaneously processed. As shown in a first row of the depth table shown in FIG. 5(b), a "sample_index" information value corresponding to Entry 1 may be displayed as a "sample_index" information value "1" of Frame 1, and a "sample_offset" information value may be displayed as a "sample_offset" information value "6" of Frame 6. In addition, the "depth_range" information value may be displayed as a "depth_range" information value "16" of Frames 1 to 6.

In addition, as shown in FIG. 5(a), since the same depth level corresponding to the same depth range is applied to Frames 7 to 12, the "sample_index" information value corresponding to Entry 2 of the depth table of FIG. 5(b) may be displayed as a "sample_index" information value "7" of Frame 7, and the "sample_offset" information value may be displayed as a "sample_offset" information value "6" of Frame 12. In addition, the "depth_range" information value may be displayed as the "depth_range" information value "4" of Frames 7 to 9.

Referring to FIG. 5(a), although a total number of samples is set to 12, frames to which the same depth level corresponding to the same depth range is applied are simultaneously processed in each entry, so that the depth table of FIG. 5(b) may include information regarding 2 entries.

Therefore, the receiver may obtain information regarding the number of frames to which the same depth level corresponding to the same depth range is applied, using the depth table shown in FIG. 5, may obtain the same depth range information only once, may decode a video frame in response to the acquired information and at the same time may generate the sound effect corresponding to a depth level of each frame, so that the synchronized 3D audio can be efficiently generated in each frame.

Figure 6:
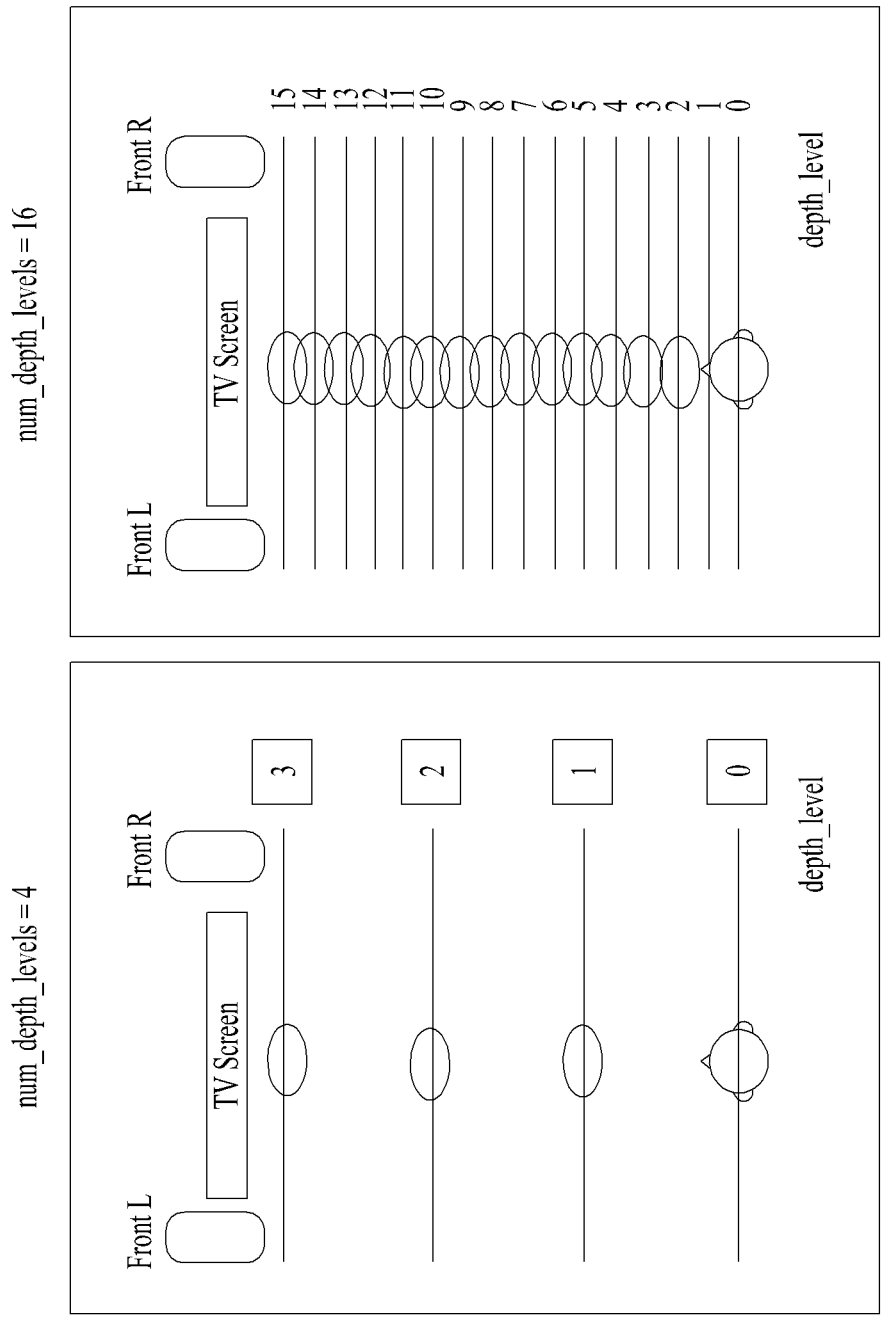
FIG. 6 is a conceptual diagram illustrating a 3D sound space according to an embodiment of the present invention.

FIG. 6 is a conceptual diagram illustrating a 3D sound space according to an embodiment of the present invention.

As described above, the 3D sound space according to one embodiment is configured to provide the 3D audio data, and may be divided into a plurality of audio spots. 3D audio data that has been obtained by application of the 3D audio effect generated in response to the corresponding depth level may be applied to respective audio spots. In addition, the number of audio spots may be changed according to the depth range and the depth level. In addition, each audio spot may be defined as a specific position within the 3D sound space, and 3D audio data that has been processed in response to each depth level may be applied to each audio spot. The 3D audio effect applied to each audio spot according to the present invention may be defined as a sound depth level. The sound depth level may be determined in response to the depth information of 3D video data.

FIG. 6 is a conceptual diagram illustrating the 3D sound space. The left 3D sound space of FIG. 6 may indicate the 3D sound space when the "depth_range" information value is set to 4, and the right 3D sound space of FIG. 6 may indicate the 3D sound space when the "depth_range" information value is set to 16. As described above, although "num_depth_levels" information has a different name from the "depth_range" information, the "num_depth_levels" information and the "depth_range" information are used as the same information. In addition, the "depth_level" information may be set to any one of values contained in the range from 0 to a "depth_range−1" value indicating the result obtained when the value of 1 is subtracted from the "depth_range" information. If the "depth_level" information value is set to zero (0), the sound depth level of the 3D audio effect corresponding to the corresponding frame may be defined as a 3D sound depth level corresponding to an audio spot located nearest to either a television (TV) or a user who views the TV within the 3D sound space. In addition, if the "depth_level" information value is denoted by "depth_range−1", the sound depth level of the 3D audio effect corresponding to the corresponding frame may be defined as a 3D sound depth level corresponding to an audio spot located farthest from the TV or the user. The 3D sound space shown in FIG. 6 is defined as a depth level corresponding to an audio spot located nearest to the user who views the TV when the "depth_level" information value is set to zero (0).

A detailed description of FIG. 6 will be given below.

The 3D sound space shown in the left side of FIG. 6 is a 3D sound when the "depth_range" information value is set to 4, the "depth_level" information value may be set to 0~3, and the 3D sound space may be divided into 4 audio spots according to the "depth_level" information value. Respective audio spots are arranged at intervals of a predetermined distance, and 3D audio to which the 3D audio effect having been generated according to the corresponding "depth_level" information value is applied to each audio spot. Therefore, the user who is located at the audio spot corresponding to "depth_level" information value=3" can recognize higher 3D audio effect than another user who is located at an audio spot corresponding to "depth_level" information value=0".

In addition, the 3D sound space shown in the right side of FIG. 6 is a 3D sound space when the "depth_range" information value is set to 16, the "depth_level" information value may be set to 0~157, and the 3D sound space may be divided into 16 audio spots according to the "depth_level" information value. Respective audio spots are arranged at intervals of a predetermined distance, and the 3D audio to which the 3D audio effect generated by the corresponding "depth_level" information value is applied can be provided to each audio spot. Accordingly, the user who is located at an audio spot corresponding to the "depth_level" information value of 14 can recognize a higher 3D audio effect than another user who is located at an audio spot corresponding to the "depth_level" information value of 0.

If the "depth_range" information value is low as shown in the left side of FIG. 6, there are a small number of audio spots according to the "depth_level" information value and the distance between the respective audio spots is long. Thus, users located at respective audio spots can clearly and correctly recognize a difference in 3D audio among the respective audio spots. In other words, when the user located at the audio spot corresponding to the "depth_level" information value is of zero (0) moves to another audio spot corresponding to the "depth_level" information value of 3, the user can recognize a difference in 3D audio effect among the respective positions.

If the "depth_range" information value is high as shown in the right side of FIG. 6, there are a large number of audio spots according to the "depth_level" information value and the distance between the respective audio spots is short, so that there may be a slight difference in 3D audio between the respective audio spots. Accordingly, if the "depth_range" information value is high, a difference in 3D audio between the respective audio spots is not significant, so that 3D audio having soft sound can be provided to the user.

Figure 7:
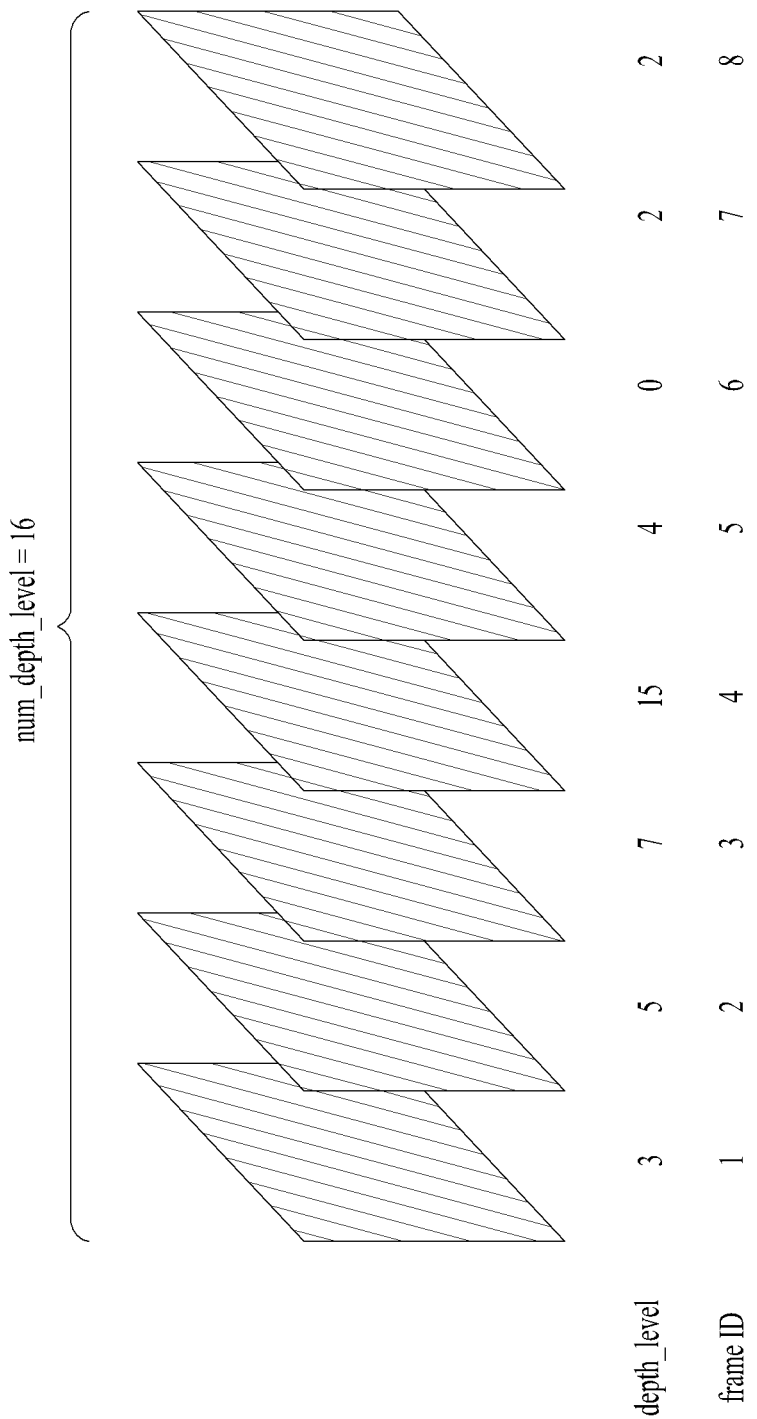
FIG. 7 is a conceptual diagram illustrating a video frame according to an embodiment of the present invention.
Figure 8:
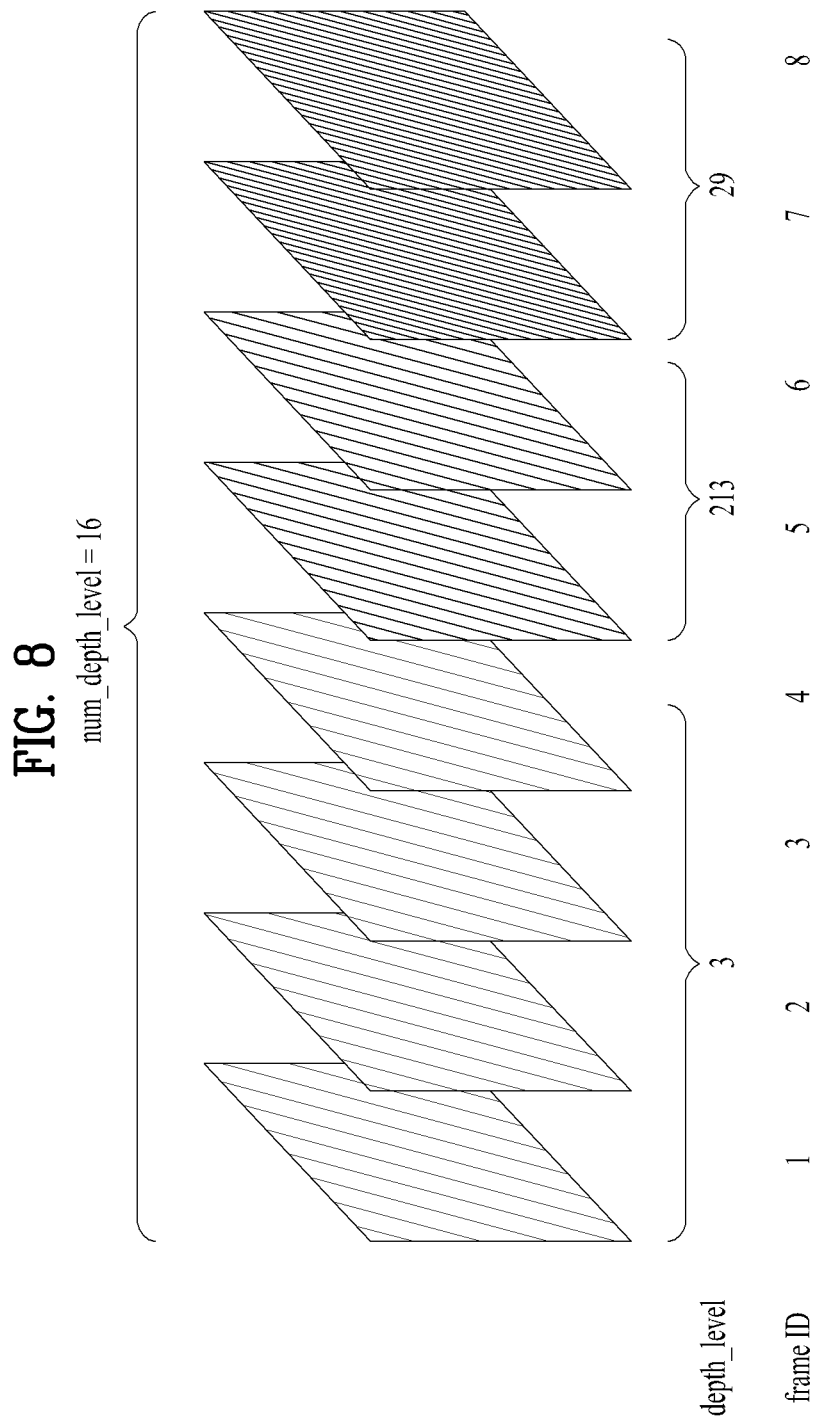
FIG. 8 is a conceptual diagram illustrating a video frame according to another embodiment of the present invention.
Figure 9:
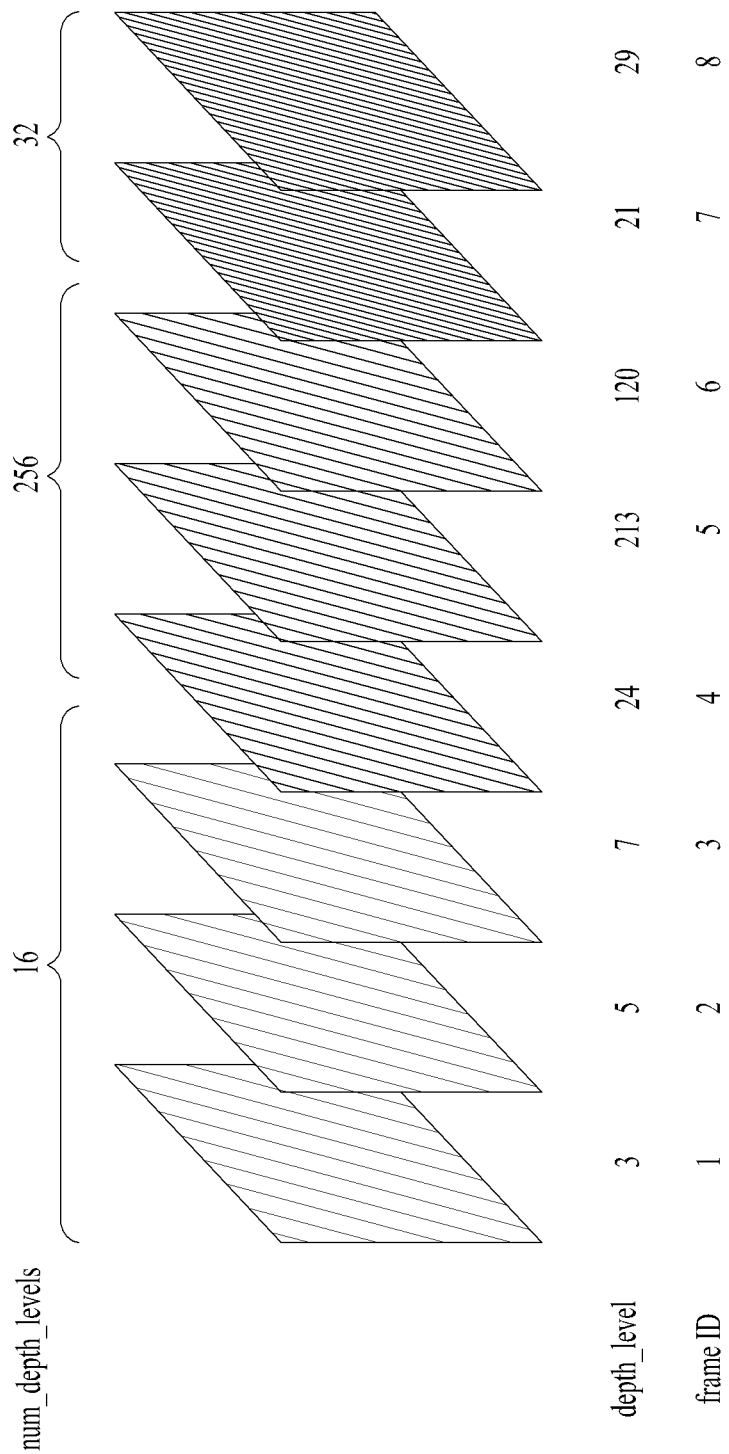
FIG. 9 is a conceptual diagram illustrating a video frame according to another embodiment of the present invention.

FIGS. 7 to 9 illustrate video frames based on the "num_depth_levels" and "depth_level_per_video_frame" information shown in Tables 1 to 5 according to the embodiments of the present invention. In FIGS. 7 to 9, the "depth_level_per_video_frame" information will hereinafter be referred to as "depth_level".

FIG. 7 is a conceptual diagram illustrating a video frame according to an embodiment of the present invention.

In FIG. 7, the depth range of depth levels of all frames contained in the video track is fixed, and the "num_depth_levels" information value of 8 video frames is set to 16. In addition, although different "depth_level" information values may be allocated to respective video frames, this "depth_level" information allocation may also be changed according to designer intention. In accordance with the embodiment of FIG. 7, the transmitter can transmit the "num_depth_levels" information and the "depth_level" information using the signaling methods shown in Tables 1 to 4, and the receiver may generate the 3D audio using the received information and provide the 3D audio to the user.

FIG. 8 is a conceptual diagram illustrating a video frame according to another embodiment of the present invention.

FIG. 8 shows another example of the video frame shown in FIG. 7. In FIG. 8, the "num_depth_levels" information values of depth levels of all frames contained in the video track are fixed, and the respective video frames may have the same or different "depth_level" information values. As shown in FIG. 8, Frames 1 to 4 may have the same "depth_level" information value of 3, Frames 5 and 6 may have the same "depth_level" information value of 213, and Frames 7 and 8 may have the same "depth_level" information value of 29. As described above, during a common mode, the transmitter may transmit the "num_depth_levels" and "depth_level" information using the signaling methods of Tables 1 to 4, and the receiver may generate the 3D audio using the received information and provide the 3D audio to the user.

FIG. 9 is a conceptual diagram illustrating a video frame according to another embodiment of the present invention.

In FIG. 9, the "depth_level" information value and the "num_depth_levels" information value of frames contained in the video track are changed, and the "num_depth_levels" information value of 8 video frames may be established in different ways on a predetermined frame basis. In this case, the "depth_level" information values of the respective frames may be assigned different values.

As shown in FIG. 9, Frames 1 to 3 have different "depth_level" information values, but have the same "num_depth_levels" value of 16. In addition, Frames 4 to 6 have different "depth_level" information values, but have the same "num_depth_levels" information value of 256. Likewise, Frames 7 and 8 may have different "depth_level" information values, but have the same "num_depth_levels" information value of 32. As described above, during a common mode, the transmitter may transmit the "num_depth_levels" and "depth_level" information using the signaling methods of Tables 1 to 4, and the receiver may generate the 3D audio using the received information and provide the 3D audio to the user.

Figure 10:
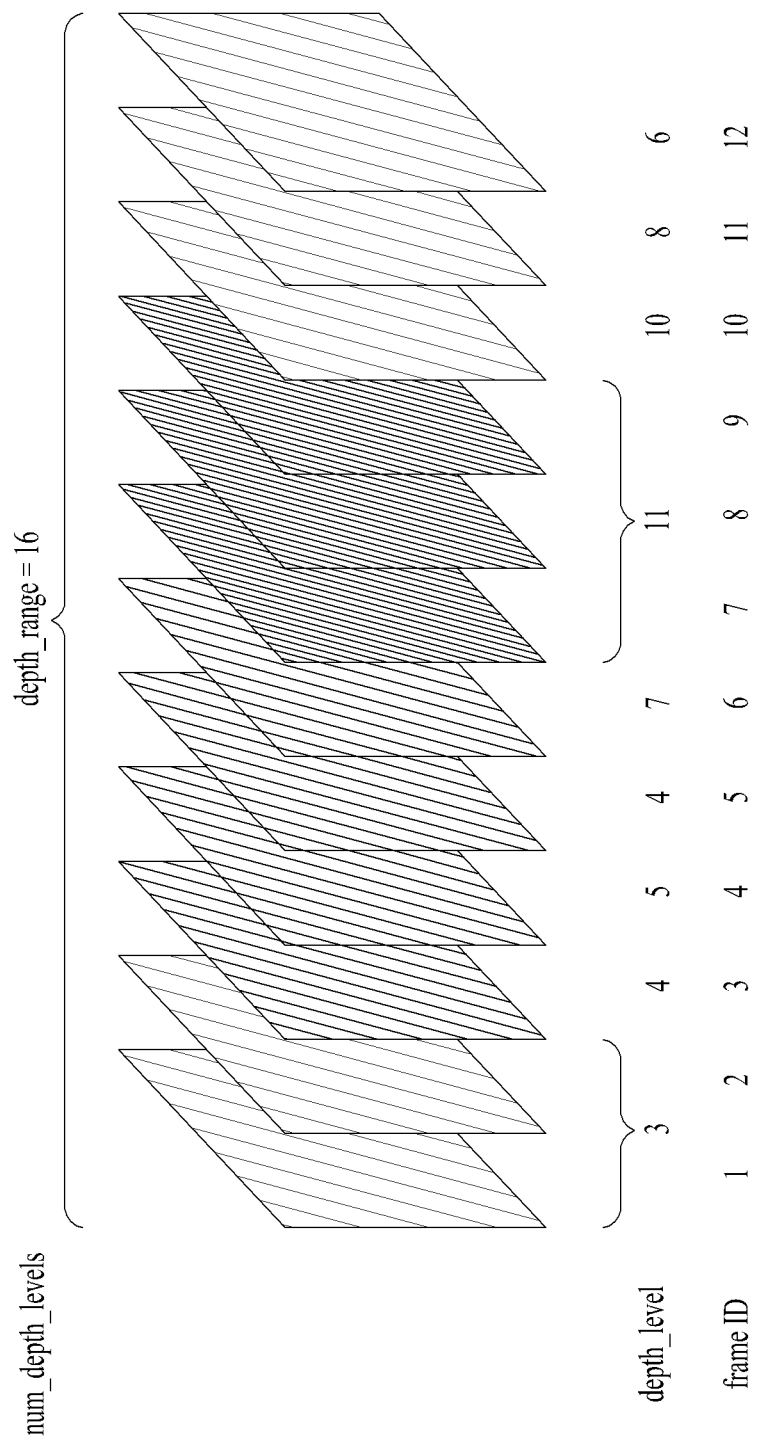
FIG. 10 is a conceptual diagram illustrating a video frame according to another embodiment of the present invention.
Figure 11:
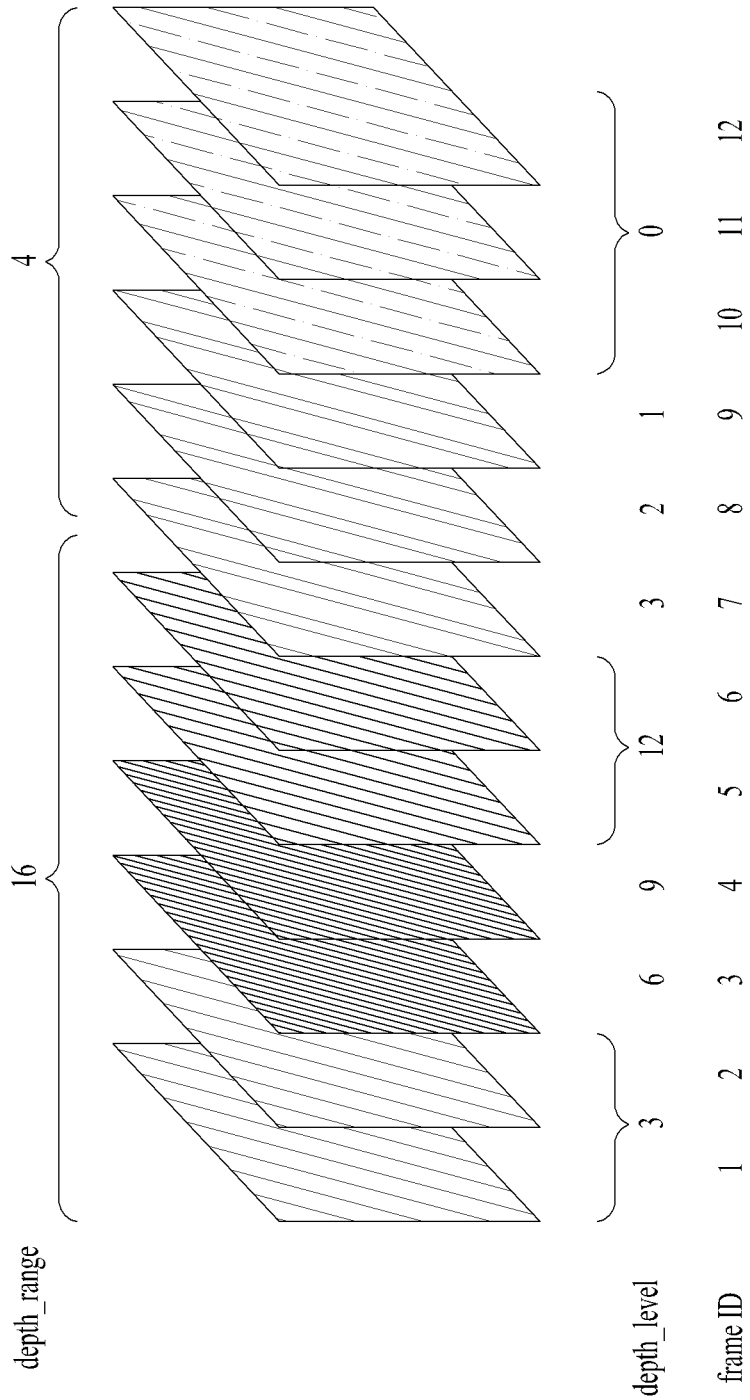
FIG. 11 is a conceptual diagram illustrating a video frame according to another embodiment of the present invention.

FIGS. 10 and 11 illustrate video frames according to the aforementioned "depth_range" and "depth_level" information of Tables 6 to 8 according to the embodiments of the present invention.

FIG. 10 is a conceptual diagram illustrating a video frame according to another embodiment of the present invention.

In FIG. 10, the depth range of depth levels of all frames contained in the video track is fixed, and the "depth_range" information value of 12 video frames is set to 16. In addition, the same or different "depth_range" information values may be allocated to respective video frames. FIG. 10 shows a general embodiment for use in a most enhanced 3D audio/video (A/V) processing device, and the embodiment of FIG. 10 may be referred to as a common mode. This "depth_range" information allocation may also be changed according to designer intention. During the common mode, the transmitter can transmit the "depth_range" information and the "depth_level" information using the signaling methods shown in Table 6 and FIG. 3, and the receiver may generate the 3D audio using the received information and provide the 3D audio to the user.

FIG. 11 is a conceptual diagram illustrating a video frame according to another embodiment of the present invention.

FIG. 11 shows an exemplary case in which the depth level and the depth range of frames contained in the video track are changed. The same or different "depth_range" information values may be allocated to 12 video frames. In addition, the respective video frames may have the same or different "depth_level" information values. In FIG. 11, Frames 1 to 6 may have the same "depth_range" information value of 16, and Frames 7 to 12 may have the same "depth_range' information value of 4. The embodiment of FIG. 11 can be used in the case in which there is a need to generate a wider variety of 3D sound effects for several parts of video content having different 3D sound characteristics, and this embodiment of FIG. 11 may also be referred to as an adaptive mode but can be changed according to designer intention. In addition, the "depth_range" information value of the adaptive mode may be changed in consideration of a minimum number of video frames through which the user can detect variation of the 3D sound effect. Therefore, the adaptive mode may indicate a series of groups including video frames corresponding to the above common mode. In the case of the adaptive mode, the transmitter may transmit the "depth_range" and "depth_level" information using the signaling methods of Tables 7~8 and FIGS. 4~5, and the receiver may generate the 3D audio using the received information and provide the 3D audio to the user.

Figure 12:
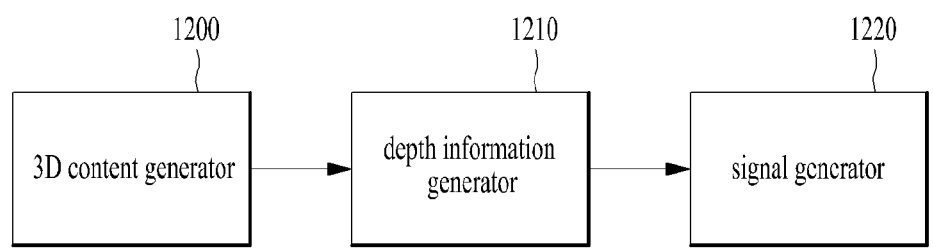
FIG. 12 is a block diagram illustrating an enhanced 3D A/V processing device according to an embodiment of the present invention.

FIG. 12 is a block diagram illustrating an enhanced 3D A/V processing device according to an embodiment of the present invention.

Referring to FIG. 12, the enhanced 3D A/V processing device may include a 3D content generator 1200, a depth information generator 1210, and a signal generator 1220.

The 3D content generator 1200 may generate 3D content including video content and audio content. The 3D content may indicate content obtained when the 3D effect is applied to the video content and the audio content. Specifically, the 3D content may conceptually include 3D content obtained by synchronization between the 3D video effect and the 3D audio effect.

The depth information generator 1210 may generate depth information of video frames constructing the video content. The depth information may be used to generate the 3D audio effect as shown in FIG. 2.

The depth information may include syntaxes shown in Tables 1 to 8 and tables shown in FIGS. 3 to 5. The depth information may be signaled through the MPEG file format. Specifically, the depth information may be signaled through the sample table box contained in the MPEG file format.

The depth information may include frame identification (ID) information, depth level information, and depth range information, and a detailed description thereof will be given below.

The frame ID information may be "sample_index" information of Table 6.

The depth level information may be either "depth_level_per_video_frame" information of Tables 1 to 5 or "depth_level" information of Tables 6 to 8. The same or different depth level information may be assigned to video frames as shown in FIGS. 7 to 11, or the depth level information may be differently established according to respective units of some consecutive video frames from among video frames.

If the depth level information is differently established according to respective units of some consecutive video frames from among video frames, the depth information may further include first offset information indicating the number of some consecutive video frames. The first offset information may be "sample_offset" information shown in Table 7 and FIG. 4.

The depth range information may be the "num_depth_levels" information shown in Tables 1 to 5 or the "depth_range" information shown in Tables 6 to 8. The same depth range information may be assigned to video frames as shown in FIGS. 7 to 11, or the depth range information may be differently established according to respective units of some consecutive video frames from among video frames.

If the depth range information is differently established according to respective units of some consecutive video frames from among video frames, the depth information may further include second offset information for indicating the number of some consecutive video frames. The second offset information may be "sample_offset" information shown in Table 8 and FIG. 5.

Thereafter, the signal generator 1220 may generate the 3D enhanced signal including the generated 3D content and the generated depth information. The 3D enhanced signal may be stored in a storage medium such as a compact disc (CD), and may be transmitted through the Internet or a broadcast network, but may be changed according to designer intention.

Figure 13:
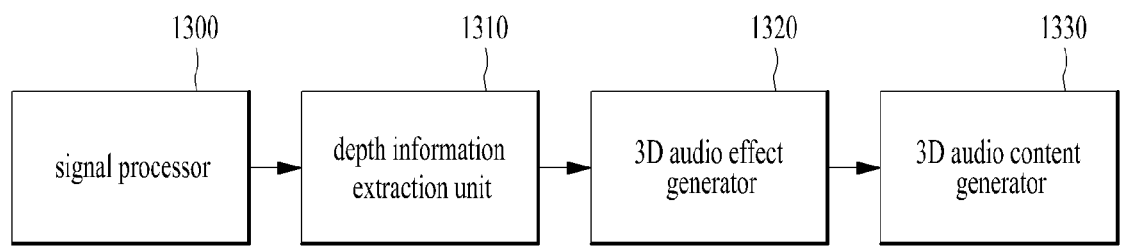
FIG. 13 is a block diagram illustrating an enhanced 3D A/V processing device according to another embodiment of the present invention.

FIG. 13 is a block diagram illustrating an enhanced 3D A/V processing device according to another embodiment of the present invention.

Referring to FIG. 13, the enhanced 3D A/V processing device according to another embodiment may include a signal processor 1300, a depth information extraction unit 1310, a 3D audio effect generator 1320, and a 3D audio content generator 1330.

The signal processor 1300 may process the enhanced 3D signal including 3D content. The signal processor 1300 may discriminate between the 3D content and the depth information contained in the enhanced 3D signal, and may also discriminate between video content and audio content contained in the 3D content. The 3D content may indicate content obtained when the 3D effect is applied to the video content and the audio content. Specifically, the 3D content may conceptually include 3D content obtained by synchronization between the 3D video effect and the 3D audio effect.

In addition, the 3D enhanced signal may be a signal stored in the storage medium such as CD, or may be received through the Internet or the broadcast network, but may also be changed according to designer intention.

The depth information extraction unit 1310 may extract depth information contained in the processed enhanced 3D signal.

The depth information may be used to generate the 3D audio effect as shown in FIG. 2.

The depth information may include the syntaxes of Tables 1 to 8 and the tables shown in FIGS. 3 to 5, and may be signaled through the MPEG file format. Specifically, the depth information may be signaled through the sample table box contained in the MPEG file format.

The depth information may include frame ID information, depth level information and depth range information.

The frame ID information may indicate the "sample_index" information shown in Table 6.

The depth level information may be "depth_level_per_video_frame" information shown in Tables 1 to 5 or "depth_level" information shown in Tables 6 to 8. The same depth level information may be assigned to respective video frames as shown in FIGS. 7 to 11, or the depth level information may be differently established according to respective video frames or may also be differently established according to respective units of some consecutive video frames from among video frames.

If the depth level information is differently established according to respective units of some consecutive video frames from among video frames, the depth information may further include first offset information for indicating the number of some consecutive video frames. The first offset information may be "sample_offset" information shown in Table 7 and FIG. 4.

The depth range information may be the "num_depth_levels" information shown in Tables 1 to 5 or the "depth_range" information shown in Tables 6 to 8. The same depth range information may be assigned to video frames as shown in FIGS. 7 to 11, or the depth range information may be differently established according to respective units of some consecutive video frames from among video frames.

If the depth range information is differently established according to respective units of some consecutive video frames from among video frames, the depth information may further include second offset information for indicating the number of some consecutive video frames. The second offset information may be "sample_offset" information shown in Table 8 and FIG. 5.

The 3D audio effect generator 1320 may generate the 3D audio effect using the acquired depth information. As illustrated in FIG. 6, the 3D sound space may be a specific region configured to provide the 3D audio, and may be divided into a plurality of audio spots. Each audio spot may be defined as a specific position contained in the 3D sound space, and the 3D audio processed in response to each depth level may be applied to each audio spot. In addition, the 3D audio effect applied to each audio spot according to the present invention may be defined as the sound depth level. The sound depth level may be determined according to depth information of the 3D video data.

Thereafter, the 3D audio content generator 1330 may generate the 3D audio content using the 3D audio effect, and a detailed description thereof is identical to those of FIG. 6.

Figure 14:
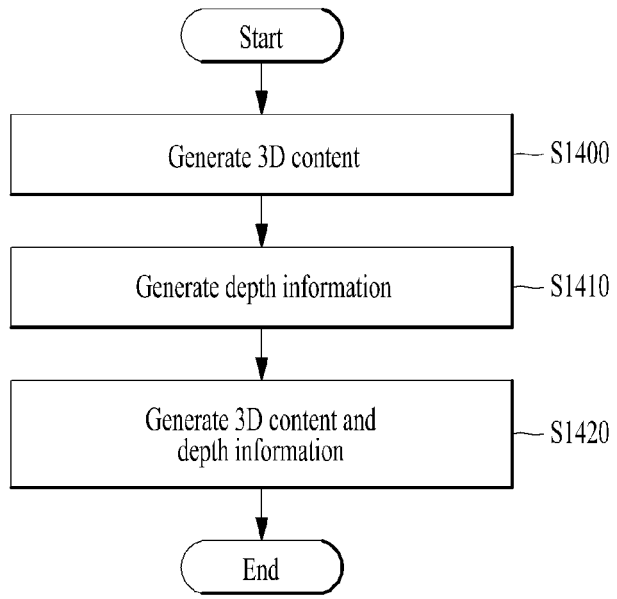
FIG. 14 is a flowchart illustrating an enhanced 3D A/V processing method according to an embodiment of the present invention.

FIG. 14 is a flowchart illustrating an enhanced 3D A/V processing method according to an embodiment of the present invention.

Referring to FIG. 14, the 3D content generator 1200 shown in FIG. 12 may generate the 3D content in step S1400. The 3D content may indicate content obtained when the 3D effect is applied to video content and audio content. Specifically, the 3D content may conceptually include 3D content obtained by synchronization between the 3D video effect and the 3D audio effect.

The depth information generator 1210 of FIG. 12 may generate depth information in step S1410. The depth information is depth information of video frames constructing the video content, and may be used to generate the 3D audio effect as shown in FIG. 2.

The depth information may include the syntaxes of Tables 1 to 8 and the tables of FIGS. 3 to 5, and may be signaled through the MPEG file format. Specifically, the depth information may be signaled through the sample table box contained in the MPEG file format.

The depth information may include frame identification (ID) information, depth level information, and depth range information, and a detailed description thereof will be given below.

The frame ID information may be "sample_index" information shown in Table 6.

The depth level information may be "depth_level_per_video_frame" information shown in Tables 1 to 5 or "depth_level" information shown in Tables 6 to 8. The same depth level information may be assigned to respective video frames as shown in FIGS. 7 to 11, or the depth level information may be differently established according to respective video frames or may also be differently established according to respective units of some consecutive video frames from among video frames.

If the depth level information is differently established according to respective units of some consecutive video frames from among video frames, the depth information may further include first offset information for indicating the number of some consecutive video frames. The first offset information may be "sample_offset" information shown in Table 7 and FIG. 4.

The depth range information may be the "num_depth_levels" information shown in Tables 1 to 5 or the "depth_range" information shown in Tables 6 to 8. The same depth range information may be assigned to video frames as shown in FIGS. 7 to 11, or the depth range information may be differently established according to respective units of some consecutive video frames from among video frames.

If the depth range information is differently established according to respective units of some consecutive video frames from among video frames, the depth information may further include second offset information for indicating the number of some consecutive video frames. The second offset information may be "sample_offset" information shown in Table 8 and FIG. 5.

Thereafter, the signal generator 1220 of FIG. 12 may generate the 3D enhanced signal including the generated 3D content and the generated depth information in step S1420. The 3D enhanced signal may be stored in a storage medium such as a compact disc (CD), and may be transmitted through the Internet or a broadcast network, or may be changed according to designer intention.

Figure 15:
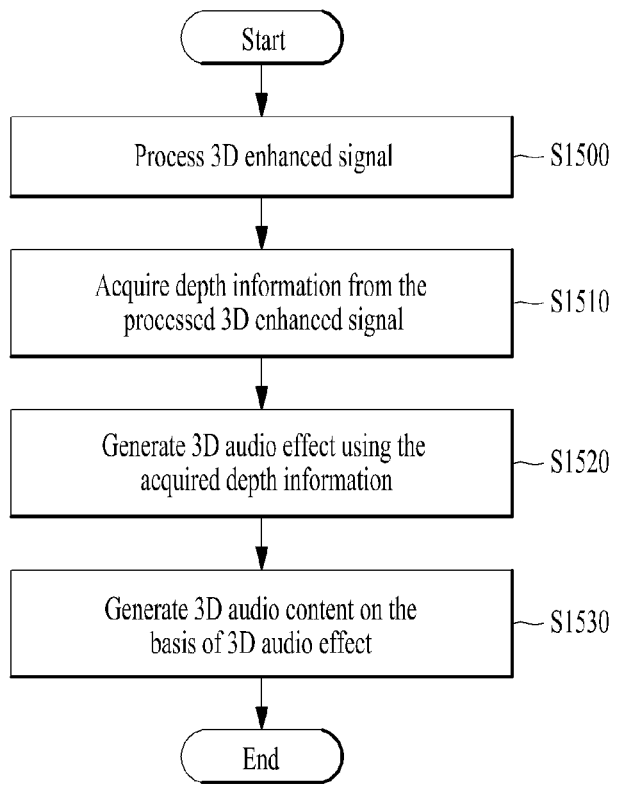
FIG. 15 is a flowchart illustrating an enhanced 3D A/V processing method according to another embodiment of the present invention.

FIG. 15 is a flowchart illustrating an enhanced 3D A/V processing method according to another embodiment of the present invention.

The signal processor 1300 of FIG. 13 may process the enhanced 3D signal including 3D content. The signal processor 1300 may discriminate between the 3D content and the depth information contained in the enhanced 3D signal, and may also discriminate between video content and audio content contained in the 3D content. The 3D content may indicate content obtained when the 3D effect is applied to the video content and the audio content. Specifically, the 3D content may conceptually include 3D content obtained by synchronization between the 3D video effect and the 3D audio effect.

In addition, the 3D enhanced signal may be a signal stored in a storage medium such as a CD, or may be received through the Internet or the broadcast network, but may also be changed according to the designer intention.

The depth information extraction unit 1310 of FIG. 13 may extract depth information contained in the processed enhanced 3D signal in step S1510.

The depth information may be used to generate the 3D audio effect as shown in FIG. 2.

The depth information may include the syntaxes of Tables 1 to 8 and the tables shown in FIGS. 3 to 5, and may be signaled through the MPEG file format. Specifically, the depth information may be signaled through the sample table box contained in the MPEG file format.

The depth information may include frame ID information, depth level information and depth range information.

The frame ID information may indicate the "sample_index" information shown in Table 6.

The depth level information may be "depth_level_per_video_frame" information shown in Tables 1 to 5 or "depth_level" information shown in Tables 6 to 8. The same depth level information may be assigned to respective video frames as shown in FIGS. 7 to 11, or the depth level information may be differently established according to respective video frames or may also be differently established according to respective units of some consecutive video frames from among video frames.

If the depth level information is differently established according to respective units of some consecutive video frames from among video frames, the depth information may further include first offset information for indicating the number of some consecutive video frames. The first offset information may be "sample_offset" information shown in Table 7 and FIG. 4.

The depth range information may be the "num_depth_levels" information shown in Tables 1 to 5 or the "depth_range" information shown in Tables 6 to 8. The same depth range information may be assigned to video frames as shown in FIGS. 7 to 11, or the depth range information may be differently established according to respective units of some consecutive video frames from among video frames.

If the depth range information is differently established according to respective units of some consecutive video frames from among video frames, the depth information may further include second offset information for indicating the number of some consecutive video frames. The second offset information may be "sample_ offset" information shown in Table 8 and FIG. 5.

The 3D audio effect generator 1320 of FIG. 13 may generate the 3D audio effect using the acquired depth information in step S1520. As illustrated in FIG. 6, the 3D sound space may be a specific region configured to provide the 3D audio, and may be divided into a plurality of audio spots. Each audio spot may be defined as a specific position contained in the 3D sound space, and the 3D audio processed in response to each depth level may be applied to each audio spot. In addition, the 3D audio effect applied to each audio spot according to the present invention may be defined as the sound depth level. The sound depth level may be determined according to depth information of the 3D video data.

Thereafter, the 3D audio content generator 1330 of FIG. 13 may generate the 3D audio content using the 3D audio effect in step S1530, and a detailed description thereof is identical to those of FIG. 6.

Mode for Invention

Various embodiments have been described in the best mode for carrying out the invention.

INDUSTRIAL APPLICABILITY

The embodiments of the present invention can be wholly or partially applied to a digital broadcast system and an enhanced 3D A/V device.

The invention claimed is:

1. An enhanced three-dimensional (3D) audiotvideo (A/V) processing method comprising:
   generating three-dimensional (3D) content including video content and audio content;
   generating audio depth information relating to video frames constructing the video content,
   wherein the audio depth information is used to generate a 3D audio effect to be applied to the audio content, and the audio depth information includes frame identification information, audio depth level information and audio depth range information,
   wherein the frame identification information indicates a frame number for identifying each video frame, the audio depth level information indicates the degree of 3D audio effect to be applied to each video frame, and the audio depth range information indicates a total number of levels of the audio depth level,
   wherein the audio depth level information has audio depth values, and each of the audio depth values corresponds to each frame number of the frame identification information, and
   wherein the audio depth range information has audio range values, and each of the audio range values corresponds to each frame number of the frame identification information; and
   generating a 3D enhanced signal including the generated 3D content and the audio depth information.

2. The method according to claim 1, wherein the audio depth information is contained in a Moving Picture Experts Group (MPEG) file format.

3. The method according to claim 1, wherein the audio depth information further includes first offset information having first offset values, and
   when consecutive video frames have a same degree of 3D audio effect, audio depth values of a rest of video frames except a foremost video frame of the consecutive video frames have null values and the first offset values indicate a sequential number of consecutive video frames which have the same of the audio depth values.

4. The method according to claim 3, wherein the audio depth information further includes second offset information having second offset values, and
   when consecutive video frames have the same of a total number of levels of the audio depth level, audio range values of a rest of video frames except the foremost video frame of the consecutive video frames have null values and the second offset values indicate a sequential number of consecutive video frames which have the same of the audio range values.

5. An enhanced three-dimensional (3D) audio/video (A/V) processing method comprising:
   processing a three-dimensional (3D) enhanced signal including 3D content configured to have video content and audio content;
   acquiring audio depth information relating to video frames constructing the video content from the processed 3D enhanced signal,
   wherein the audio depth information is used to generate a 3D audio effect to be applied to the audio content, and the audio depth information includes frame identification information, audio depth level information and audio depth range information,
   wherein the frame identification information indicates a frame number for identifying each video frame, the audio depth level information indicates the degree of 3D audio effect to be applied to each video frame, and the audio depth range information indicates a total number of levels of the audio depth level,
   wherein the audio depth level information has audio depth values, each of the audio depth values corresponds to each frame number of the frame identification information, and
   wherein the audio depth range information has audio range values, each of the audio range values corresponds to each frame number of the frame identification information;
   generating a 3D audio effect according to the acquired audio depth information; and
   generating 3D audio content on the basis of the generated 3D audio effect.

6. The method according to claim 5, wherein the audio depth information is contained in a Moving Picture Experts Group (MPEG) file format.

7. The method according to claim 5, wherein the audio depth information further includes first offset information having first offset values, and
   when consecutive video frames have a same degree of 3D audio effect, audio depth values of a rest of video frames except a foremost video frame of the consecutive video frames have null values and the first offset values indicate a sequential number of consecutive video frames which have the same of the audio depth values.

8. The method according to claim 7, wherein the audio depth information further includes second offset information having second offset values, and when consecutive video frames have the same of a total number of levels of the audio depth level, audio range values of a rest of video frames except the foremost video frame of the consecutive video frames have null values and the second offset values indicate a sequential number of consecutive video frames which have the same of the audio range values.

9. An enhanced three-dimensional (3D) audio/video (A/V) processing apparatus comprising:
a 3D content generator configured to generate 3D content including video content and audio content;
a depth information generator configured to generate audio depth information relating to video frames constructing the video content,
wherein the audio depth information is used to generate a 3D audio effect to be applied to the audio content, and the audio depth information includes frame identification information, audio depth level information and audio depth range information,
wherein the frame identification information indicates a frame number for identifying each video frame, the audio depth level information indicates the degree of 3D audio effect to be applied to each video frame, and the audio depth range information indicates a total number of levels of the audio depth level,
wherein the audio depth level information has audio depth values, each of the audio depth values corresponds to each frame number of the frame identification information, and
wherein the audio depth range information has audio range values, each of the audio range values corresponds to each frame number of the frame identification information; and
a signal generator configured to generate a 3D enhanced signal including the generated 3D content and the audio depth information.

10. The apparatus according to claim 9, wherein the audio depth information is contained in a Moving Picture Experts Group (MPEG) file format.

11. The apparatus according to claim 9, wherein the audio dept information further includes first offset information having first offset values, and
when consecutive video frames have a same degree of 3D audio effect, audio depth values of a rest of video frames except a foremost video frame of the consecutive video frames have null values and the first offset values indicate a sequential number of consecutive video frames which have the same of the audio depth values.

12. The apparatus according to claim 11, wherein the audio depth information further includes second offset information having second offset values, and
when consecutive video frames have the same of a total number of levels of the audio depth level, audio range values of a rest of video frames except the foremost video frame of the consecutive video frames have null values and the second offset values indicate a sequential number of consecutive video frames which have the same of the audio range values.

13. An enhanced three-dimensional (3D) audio/video (A/V) processing apparatus comprising:
a signal processor to process a three-dimensional (3D) enhanced signal including 3D content configured to have video content and audio content;
a depth information extraction unit configured to acquire audio depth information relating to video frames constructing the video content from the processed 3D enhanced signal,
wherein the audio depth information is used to generate a 3D audio effect to be applied to the audio content, and the audio depth information includes frame identification information, audio depth level information and audio depth range information,
wherein the frame identification information indicates a frame number for identifying each video frame, the depth level information indicates the degree of 3D effect to be applied to each video frame, and the audio depth range information indicates a total number of levels of the audio depth level,
wherein the audio depth level information has audio depth values, each of the audio depth values corresponds to each frame number of the frame identification information, and
wherein the audio depth range information has audio range values, each of the audio range values corresponds to each frame number of the frame identification information;
a 3D audio effect generator configured to generate a 3D audio effect according to the acquired audio depth information; and
a 3D audio content generator configured to generate 3D audio content on the basis of the generated 3D audio effect.

14. The apparatus according to claim 13, wherein the audio depth information is contained in a Moving Picture Experts Group (MPEG) file format.

15. The apparatus according to claim 13, wherein the audio depth information further includes first offset information having first offset values, and
when consecutive video frames have a same degree of 3D audio effect, audio depth values of a rest of video frames except a foremost video frame of the consecutive video frames have null values and the first offset values indicate a sequential number of consecutive video frames which have the same of the audio depth values.

16. The apparatus according to claim 15, wherein the audio depth information further includes second offset information having second offset values, and
when consecutive video frames have the same of a total number of levels of the audio depth level, audio range values of a rest of video frames except the foremost video frame of the consecutive video frames have null values and the second offset values indicate a sequential number of consecutive video frames which have the same of the audio range values.

* * * * *